(12) United States Patent
Hori

(10) Patent No.: US 9,776,497 B2
(45) Date of Patent: Oct. 3, 2017

(54) VEHICLE DRIVING SYSTEM

(75) Inventor: Takeshi Hori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 256 days.

(21) Appl. No.: 14/347,191

(22) PCT Filed: Sep. 14, 2012

(86) PCT No.: PCT/JP2012/073660
§ 371 (c)(1),
(2), (4) Date: Mar. 25, 2014

(87) PCT Pub. No.: WO2013/047243
PCT Pub. Date: Apr. 4, 2013

(65) Prior Publication Data
US 2014/0231165 A1    Aug. 21, 2014

(30) Foreign Application Priority Data

Sep. 26, 2011 (JP) ................................. 2011-209292

(51) Int. Cl.
B60K 6/30 (2007.10)
B60L 7/12 (2006.01)
(Continued)

(52) U.S. Cl.
CPC ................ *B60K 6/30* (2013.01); *B60K 6/105* (2013.01); *B60K 6/387* (2013.01); *B60K 6/442* (2013.01);
(Continued)

(58) Field of Classification Search
CPC ...... B60L 7/12; B60L 15/2054; B60L 11/126; B60L 11/16; B60K 6/30; B60K 6/48;
(Continued)

(56) References Cited

U.S. PATENT DOCUMENTS 3,221,172 A * 11/1965 Rolison ..................... H02J 9/08
290/30 A
3,923,115 A * 12/1975 Helling ................. B60K 6/105
180/165
(Continued)

FOREIGN PATENT DOCUMENTS

DE          19700893 C1 *  9/1998  ............. B60K 6/105
DE    20 2007015050 U1    1/2008
(Continued)

OTHER PUBLICATIONS

Extended European Search Report dated Oct. 16, 2015, issued in counterpart European Patent Application No. 12835107.9, (11 pages).

(Continued)

*Primary Examiner* — J. Allen Shriver, II
*Assistant Examiner* — Steve Clemmons
(74) *Attorney, Agent, or Firm* — Westerman, Hattori, Daniels & Adrian, LLP

(57) ABSTRACT

A vehicle driving system 1 includes a first motor/generator M/G1 which is mechanically connected to either of front wheels Wf and rear wheels Wr of a vehicle, a second motor/generator M/G2 which is electrically connected with the first motor/generator M/G1, and a flywheel FW which is mechanically connected with the second motor/generator M/G2 and which stores kinetic energy. The second motor/generator M/G2 is mechanically connected to the other of the front wheels Wf and the rear wheels Wr of the vehicle.

32 Claims, 21 Drawing Sheets

(51) Int. Cl.
| | | |
|---|---|---|
| B60L 11/16 | (2006.01) | |
| B60L 15/20 | (2006.01) | |
| B60K 6/48 | (2007.10) | |
| B60L 3/10 | (2006.01) | |
| B60L 11/12 | (2006.01) | |
| B60K 6/10 | (2006.01) | |
| B60K 6/52 | (2007.10) | |
| B60W 10/02 | (2006.01) | |
| B60K 17/34 | (2006.01) | |
| B60W 10/08 | (2006.01) | |
| B60W 30/18 | (2012.01) | |
| B60K 6/387 | (2007.10) | |
| B60K 6/442 | (2007.10) | |
| B60K 6/46 | (2007.10) | |
| B60K 17/356 | (2006.01) | |

(52) U.S. Cl.
CPC ............. *B60K 6/46* (2013.01); *B60K 6/48* (2013.01); *B60K 6/52* (2013.01); *B60K 17/34* (2013.01); *B60L 3/106* (2013.01); *B60L 7/12* (2013.01); *B60L 11/126* (2013.01); *B60L 11/16* (2013.01); *B60L 15/2054* (2013.01); *B60W 10/02* (2013.01); *B60W 10/08* (2013.01); *B60W 30/18127* (2013.01); *B60K 17/356* (2013.01); *B60L 2220/42* (2013.01); *B60L 2240/465* (2013.01); *B60L 2240/507* (2013.01); *B60L 2260/28* (2013.01); *F16D 2500/1083* (2013.01); *F16D 2500/10462* (2013.01); *F16D 2500/3026* (2013.01); *F16D 2500/50615* (2013.01); *F16D 2500/7041* (2013.01); *F16D 2500/7044* (2013.01); *Y02T 10/6217* (2013.01); *Y02T 10/6265* (2013.01); *Y02T 10/645* (2013.01); *Y02T 10/648* (2013.01); *Y02T 10/7027* (2013.01); *Y02T 10/7033* (2013.01); *Y02T 10/7077* (2013.01); *Y02T 10/72* (2013.01); *Y02T 10/7275* (2013.01); *Y10S 903/96* (2013.01)

(58) Field of Classification Search
CPC ......... B60K 6/105; B60K 6/52; B60W 10/02; F16D 48/06
See application file for complete search history.

(56) References Cited

U.S. PATENT DOCUMENTS

| | | | | |
|---|---|---|---|---|
| 4,233,858 | A * | 11/1980 | Rowlett | B60K 6/105 180/65.235 |
| 4,588,040 | A * | 5/1986 | Albright, Jr. | B60K 6/30 180/165 |
| 6,554,088 | B2 * | 4/2003 | Severinsky | B60H 1/004 180/65.23 |
| 7,395,888 | B2 * | 7/2008 | Yamamoto | B60K 6/42 180/233 |
| 7,497,285 | B1 * | 3/2009 | Radev | B60K 6/26 180/65.225 |
| 7,740,092 | B2 * | 6/2010 | Bender | B60K 6/28 180/65.29 |
| 7,768,176 | B2 * | 8/2010 | Leijon | B60K 6/105 180/65.31 |
| 8,398,515 | B2 * | 3/2013 | Sartre | B60K 6/105 180/65.235 |
| 8,483,897 | B2 * | 7/2013 | Marus | B60L 1/003 701/22 |
| 8,702,547 | B2 * | 4/2014 | Van Druten | B60K 6/105 475/111 |
| 2003/0098185 | A1 | 5/2003 | Komeda et al. | |
| 2006/0250902 | A1 * | 11/2006 | Bender | B60K 6/46 369/1 |
| 2009/0095549 | A1 * | 4/2009 | Dalum | B60K 6/12 180/65.265 |

FOREIGN PATENT DOCUMENTS

| | | |
|---|---|---|
| JP | 10-075504 A | 3/1998 |
| JP | 10-108305 A | 4/1998 |
| JP | 11-127502 A | 5/1999 |
| JP | 2001-090748 A | 4/2001 |
| JP | 2002067723 A | 3/2002 |
| JP | 2003-165361 A | 6/2003 |
| JP | 2006335351 A | 12/2006 |
| JP | 2008-260383 A | 10/2008 |
| JP | 2010-221907 A | 10/2010 |
| WO | 2010/059041 A1 | 5/2010 |
| WO | 2010082079 A1 | 7/2010 |

OTHER PUBLICATIONS

Office Action dated Aug. 26, 2015, issued in counterpart Chinese Patent Application No. 201280046425.5, with English translation (14 pages).

International Search Report, dated Dec. 4, 2012, issued in corresponding application No. PCT/JP2012/073660.

\* cited by examiner

FIG. 2
<< DURING NORMAL DRIVING >>
(a) < FRONT-WHEEL DRIVE (2WD) >
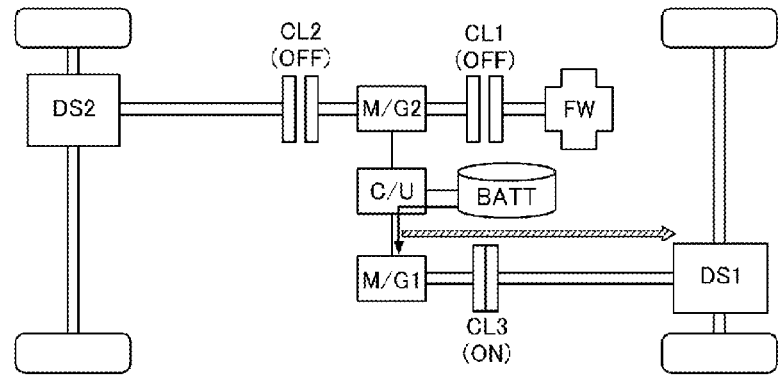
(b) < REAR-WHEEL DRIVE (2WD) >
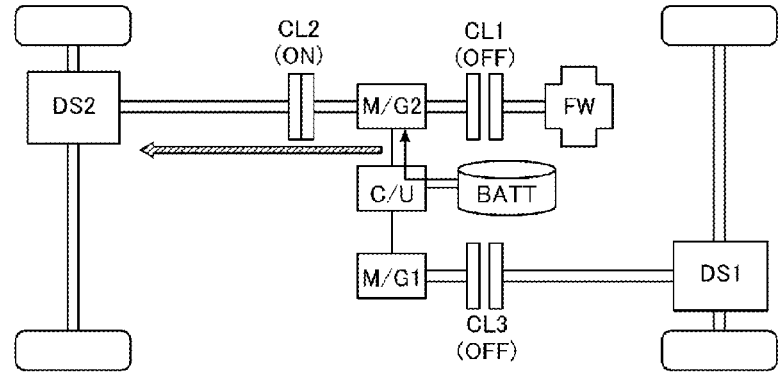
(c) < FOUR-WHEEL DRIVE (4WD) >
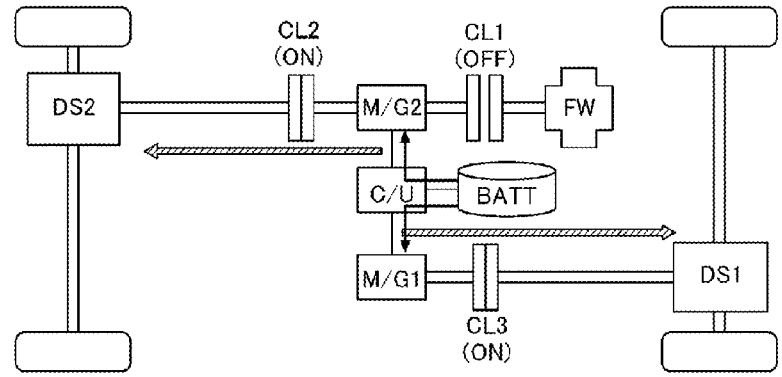

FIG. 3
<< DURING REGENERATIVE BRAKING >>
(a) DURING FW STORAGE (REGENERATION AMOUNT ≤ FW STORAGE CAPACITY)
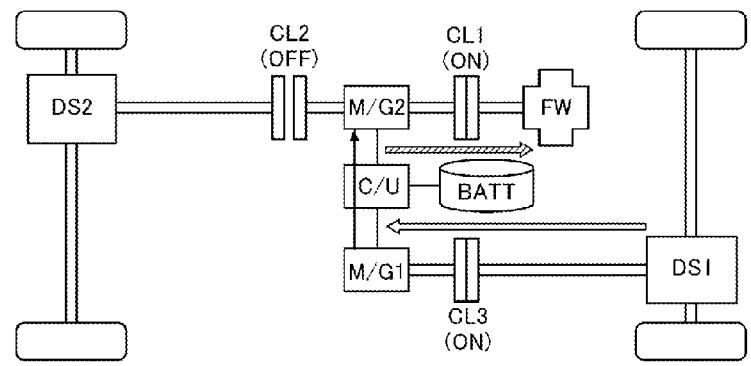
(b) DURING BATT CHARGING (REGENERATION AMOUNT > FW STORAGE CAPACITY)
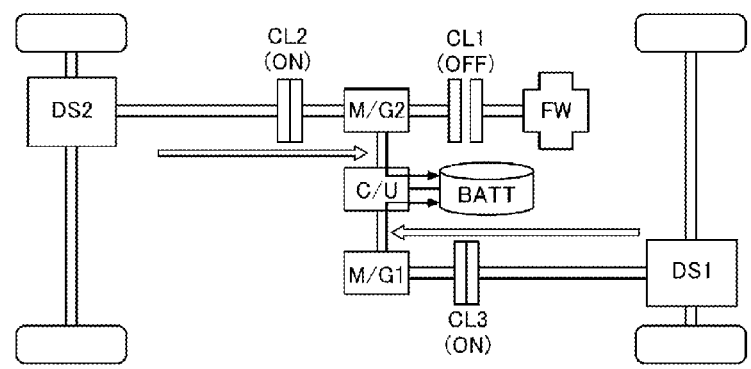

<< DURING FW DISCHARGE >>

FIG. 13
<< DURING NORMAL DRIVING >>
(a) < FRONT-WHEEL DRIVE (2WD) >
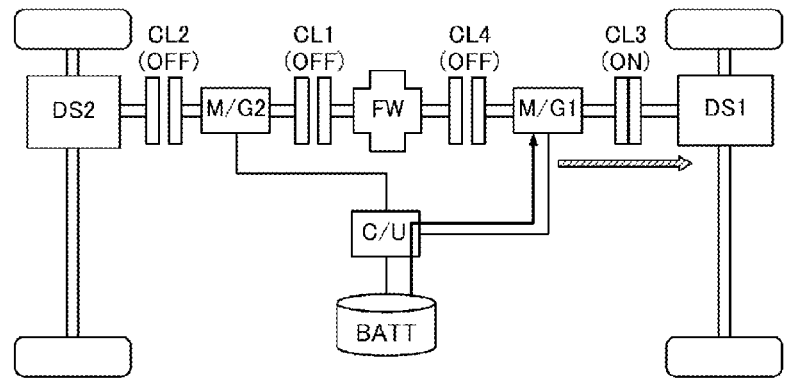
(b) < REAR-WHEEL DRIVE (2WD) >
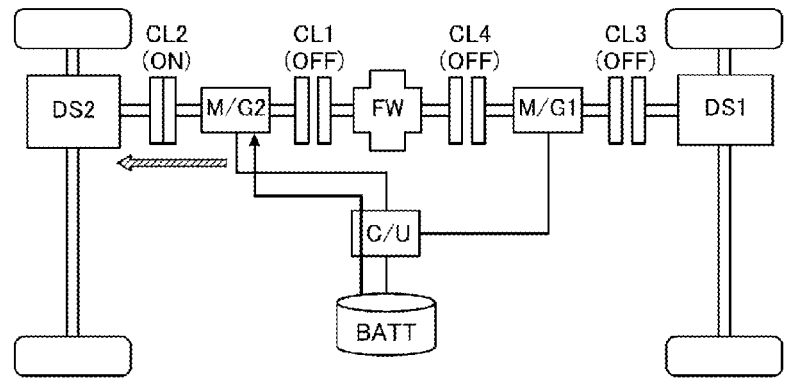
(c) < FOUR-WHEEL DRIVE (4WD) >
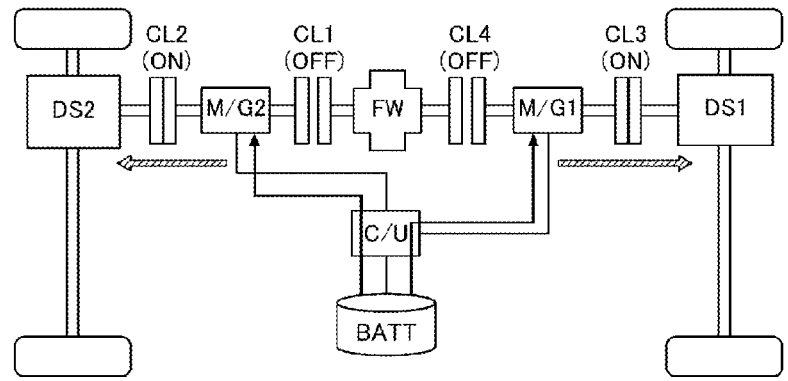

FIG. 14

<< DURING REGENERATIVE BRAKING >>

(a) DURING FW STORAGE
{(REGENERATION AMOUNT ≤ FW STORAGE CAPACITY) +
(DS1 ESTIMATED REGENERATION AMOUNT > DS2 ESTIMATED REGENERATION AMOUNT)}

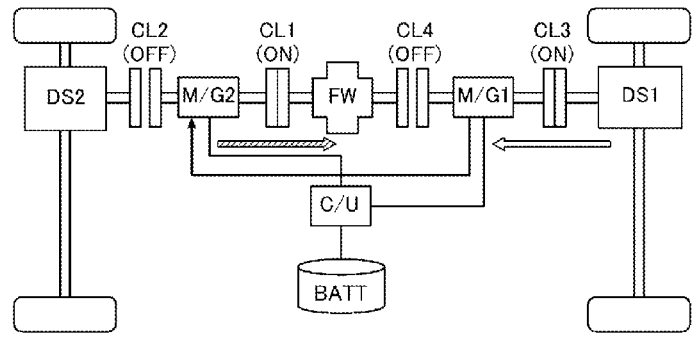

(b) DURING FW STORAGE
{(REGENERATION AMOUNT ≤ FW STORAGE CAPACITY) +
(DS1 ESTIMATED REGENERATION AMOUNT < DS2 ESTIMATED REGENERATION AMOUNT)}

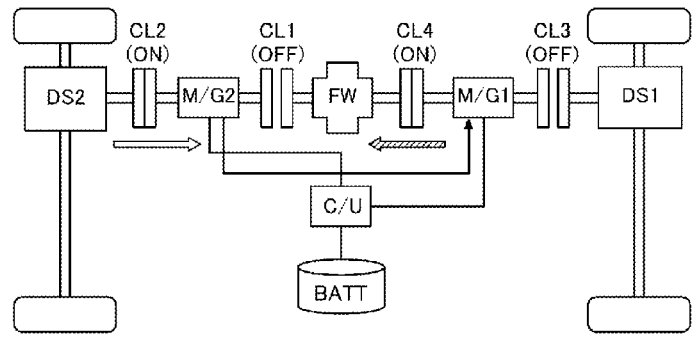

(c) DURING BATT CHARGING
(REGENERATION AMOUNT > FW STORAGE CAPACITY)

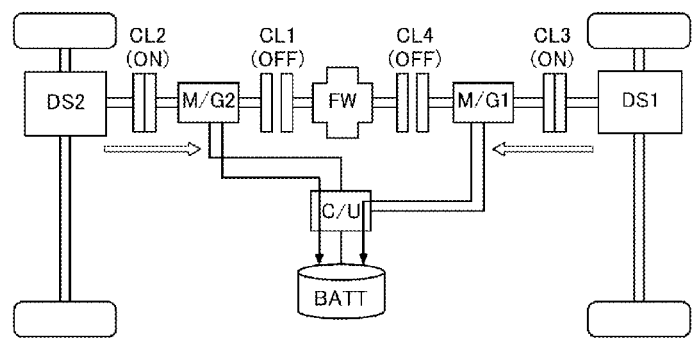

FIG. 15
<< DURING FW DISCHARGE >>
(a) DS1 ESTIMATED SLIP AMOUNT < DS2 ESTIMATED SLIP AMOUNT
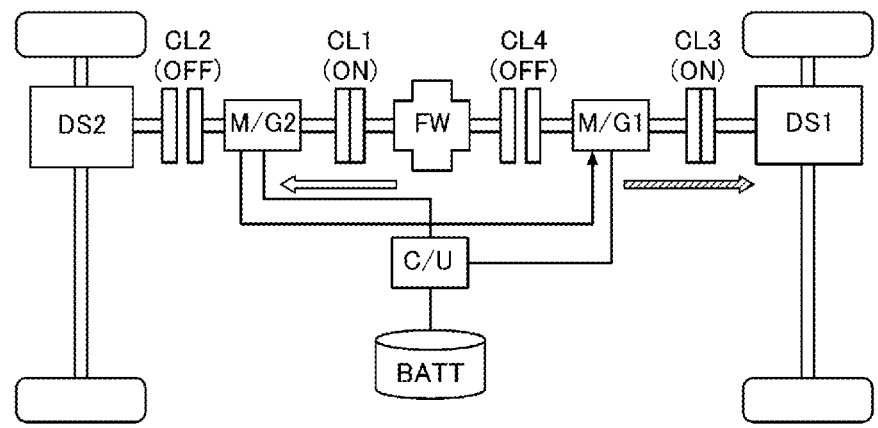
(b) DS1 ESTIMATED SLIP AMOUNT > DS2 ESTIMATED SLIP AMOUNT
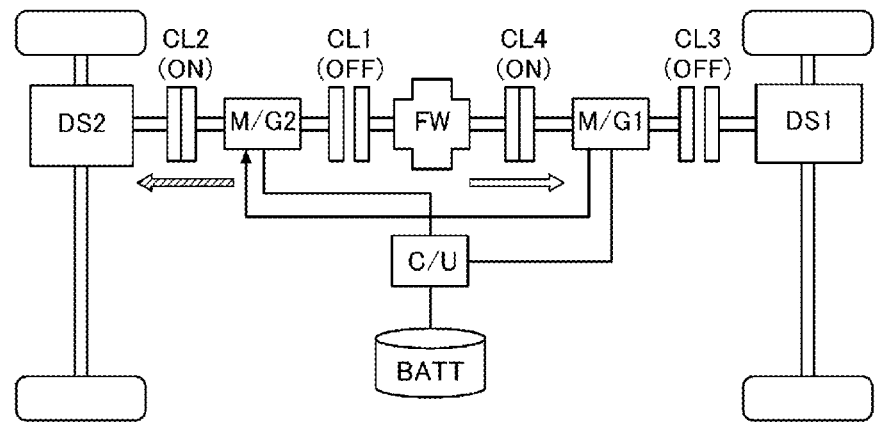

FIG. 17
<< DURING NORMAL DRIVING >>
(a) < FRONT-WHEEL DRIVE (2WD) >
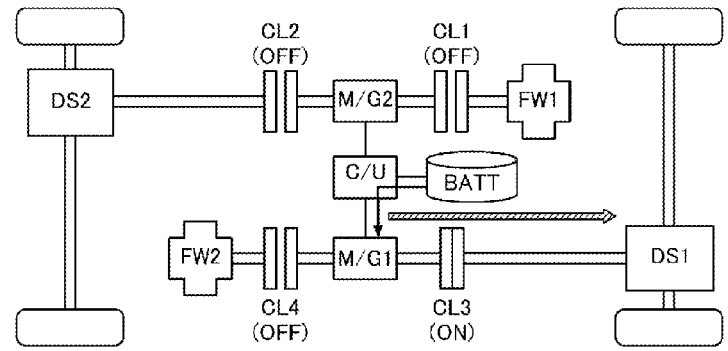
(b) < REAR-WHEEL DRIVE (2WD) >
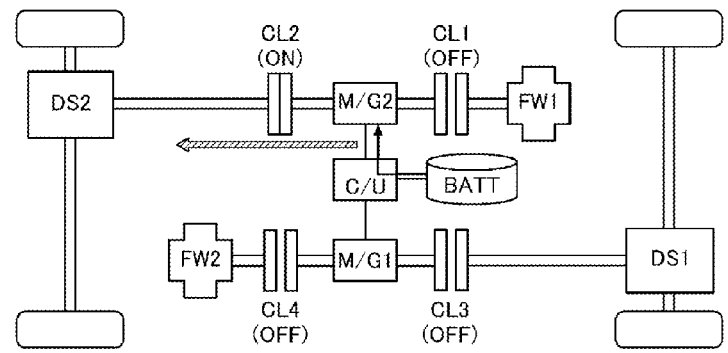
(c) < FOUR-WHEEL DRIVE (4WD) >
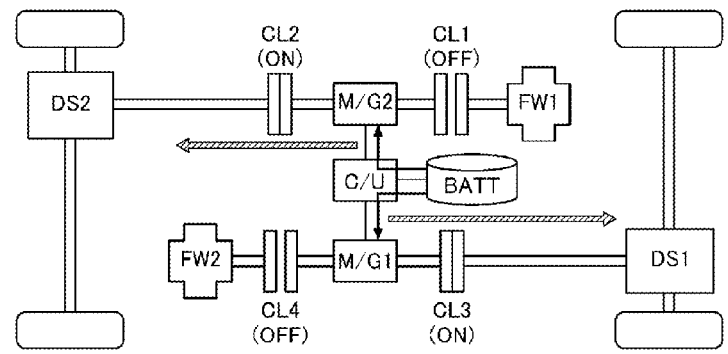

FIG. 18

<< DURING REGENERATIVE BRAKING >>

(a) DURING FW STORAGE
{(REGENERATION AMOUNT ≤ FW STORAGE CAPACITY) +
(DS1 ESTIMATED REGENERATION AMOUNT > DS2 ESTIMATED REGENERATION AMOUNT)}

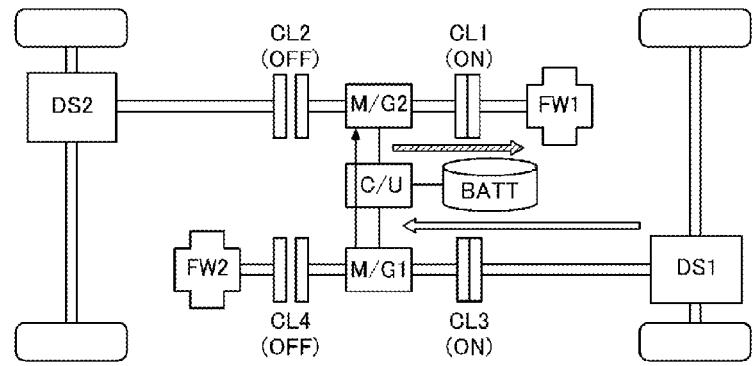

(b) DURING FW STORAGE
{(REGENERATION AMOUNT ≤ FW STORAGE CAPACITY) +
(DS1 ESTIMATED REGENERATION AMOUNT < DS2 ESTIMATED REGENERATION AMOUNT)}

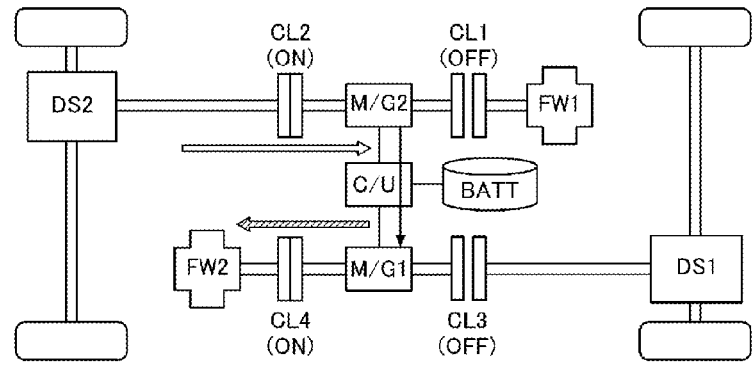

(c) DURING BATT CHARGING
(REGENERATION AMOUNT > FW STORAGE CAPACITY)

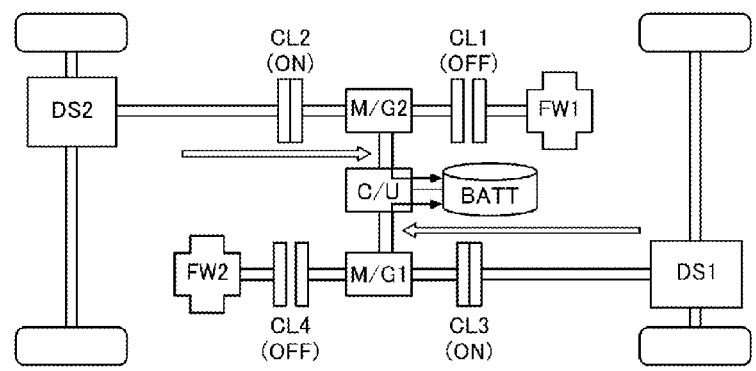

FIG. 19
<< DURING FW DISCHARGE >>
(a) DS1 ESTIMATED SLIP AMOUNT < DS2 ESTIMATED SLIP AMOUNT
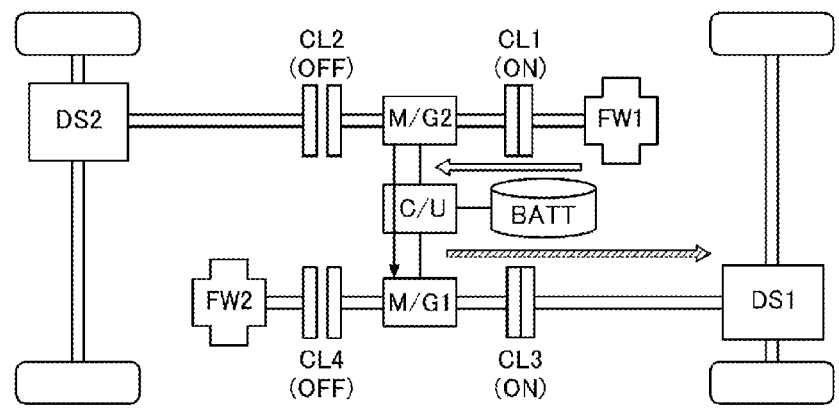
(b) DS1 ESTIMATED SLIP AMOUNT > DS2 ESTIMATED SLIP AMOUNT
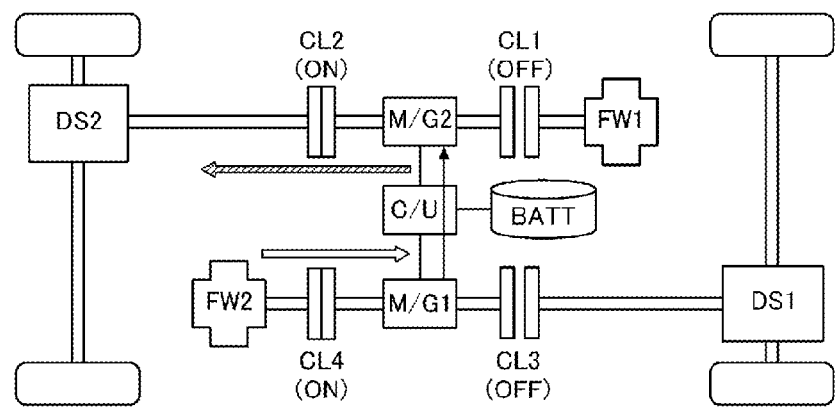

VEHICLE DRIVING SYSTEM

TECHNICAL FIELD

The present invention relates to a vehicle driving system which includes a kinetic energy storing device which is mechanically connected with a motor/generator and which stores kinetic energy.

BACKGROUND ART

Patent Literature 1 describes a hybrid vehicle including, as shown in FIG. 20, a flywheel driving generator 113 which rotationally drives a flywheel 112 or which generates electricity using the flywheel 112, a drive shaft driving generator 116 which rotationally drives a drive shaft DS or which generates electricity by retarding the motion of the drive shaft DS, a battery 115 which stores electric energy for starting, a generating device 111 (preferably a fuel cell) which generates driving electricity, and a power controller 117 which controls the flywheel driving generator 113 and the drive shaft driving generator 116. When vehicle driving electric power is larger than a generated electricity output capacity of the generating device 111, the power controller 117 controls so that electricity is generated by the flywheel driving generator 113. In addition, when the vehicle driving electric power is smaller than the generated electricity output capacity and when the brakes are applied to slow or stop the vehicle, the power controller 117 controls so that surplus electric power and electric power generated during braking are stored in the flywheel 112 as energy.

Patent Literature 2 describes a fuel cell hybrid electric vehicle which is equipped with a fuel cell 211 and a flywheel 212 as shown in FIG. 21, including, for storing braking energy of the vehicle, a main transmission 214 and a main clutch 213 which are provided between an electric motor 216 and the flywheel 212, a battery 215 which stores electric energy for starting the fuel cell electric vehicle, and a flywheel controller 217 which controls them, wherein the flywheel controller 217 controls the flywheel 212, the main transmission 214 and the main clutch 213 so that electric energy from the fuel cell 211 and the battery 215 is converted into mechanical energy via the electric motor 216, transmits the mechanical energy to a drive shaft DS and stores surplus mechanical energy. Reference numeral 222 denotes a sub clutch, and reference numeral 223 denotes a sub transmission, reference numeral 224 denoting a differential gear.

RELATED ART LITERATURE

Patent Literature

Patent Literature 1: JP-H10-108305-A
Patent Literature 2: JP-H10-075504-A

SUMMARY OF THE INVENTION

Problem that the Invention is to Solve

In the hybrid vehicle of Patent Literature 1, since the flywheel driving generator 113 is not mechanically connected with a drive shaft which is different from the drive shaft DS, another motor/generator is necessary to execute four-wheel driving. In addition, when the flywheel 112 stores a predetermined level of energy or more, regeneration can be executed only by the drive shaft driving generator 116.

In the fuel cell hybrid electric vehicle of Patent Literature 2, it is described that when recovering kinetic energy which is generated during braking, the main transmission 214 is controlled so that the rotation speed of the flywheel 212 becomes higher than the rotation speed at the side of the electric motor, whereafter the kinetic energy is stored in the flywheel 212 by engaging the main clutch 213 (putting it ON). Thus, since the flywheel 212 is not configured to store electric power regenerated in the electric motor 216 but is configured to store mechanical energy, the main transmission 214 is necessary to match the rotation speeds.

The invention has been made in view of the problems, and an object thereof is to provide a vehicle driving system which includes a kinetic energy storing device and which can increase the numbers of driving wheels and wheels for regenerative braking without increasing the number of motor/generators.

Means for Solving the Problem

With a view to achieving the object, the first aspect of embodiments provides a vehicle driving system (e.g., vehicle driving systems 1, 1A, 1B, 1C in embodiment) including:

a first motor/generator (e.g., a first motor/generator M/G1 in embodiment) which is mechanically connected with a first wheel (e.g., a front wheel Wf or a rear wheel Wr in embodiment) of a vehicle;

a second motor/generator (e.g., a second motor/generator M/G2 in embodiment) which is electrically connected with the first motor/generator; and a kinetic energy storing device (e.g., a flywheel FW, a first flywheel FW1 in embodiment) which is mechanically connected with the second motor/generator and which stores kinetic energy, wherein the second motor/generator is mechanically connected with a second wheel (e.g., the rear wheel Wr or the front wheel Wf in embodiment) of the vehicle.

The second aspect provides, based on the first aspect, the vehicle driving system, further including:

a first engaging/disengaging unit (e.g., a first clutch CL1 in embodiment) which is provided on a power transmission path between the second motor/generator and the kinetic energy storing device and which engages or disengages a side of the second motor/generator and a side of the kinetic energy storing device by being applied or released; and a second engaging/disengaging unit (e.g., a second clutch CL2 in embodiment) which is provided on a power transmission path between the second motor/generator and the second wheel and which engages or disengages a side of the second motor/generator and a side of the second wheel by being applied or released.

The third aspect provides, based on the second aspect, the vehicle driving system, wherein, when the first motor/generator is driven for regeneration by receiving power from the first wheel, the first engaging/disengaging unit is applied, and the second motor/generator is driven for power running.

The fourth aspect provides, based on the third aspect, the vehicle driving system, wherein, when the first motor/generator is driven for regeneration by receiving power from the first wheel, the second engaging/disengaging unit is released, and the second motor/generator and the second wheel are disengaged.

The fifth aspect provides, based on the third or fourth aspect, the vehicle driving system, further including:

an electric energy storing device (e.g., a battery BATT in embodiment) which is electrically connected with the first motor/generator.

The sixth aspect provides, based on the fifth aspect, the vehicle driving system, wherein, when the energy stored in the kinetic energy storing device is of a predetermined level or higher, the first engaging/disengaging unit is released, and the driving of the second motor/generator for power running is stopped or is suppressed.

The seventh aspect provides, based on the fifth aspect, the vehicle driving system, wherein, when the energy stored in the kinetic energy storing device is of a predetermined level or higher, the first engaging/disengaging unit is released, the second engaging/disengaging unit is applied, and the second motor/generator is driven for regeneration.

The eighth aspect provides, based on the second aspect, the vehicle driving system, further including:

an electric energy storing device (e.g., a battery BATT in embodiment) which is electrically connected with the first motor/generator and the second motor/generator, wherein, when the first motor/generator is driven for regeneration by receiving power from the first wheel and the second motor/generator is driven for regeneration by receiving power from the second wheel, the first engaging/disengaging unit is released, while the second engaging/disengaging unit is applied.

The ninth aspect provides, based on the second aspect, the vehicle driving system, wherein, when the second motor/generator is driven for regeneration by receiving power from the kinetic energy storing device, the first engaging/disengaging unit is applied, and the first motor/generator is driven for power running.

The tenth aspect provides, based on the ninth aspect, the vehicle driving system, further including:

an electric energy storing device (e.g., a battery BATT in embodiment) which is electrically connected with the first motor/generator.

The eleventh aspect provides, based on the tenth aspect, the vehicle driving system, wherein, when the energy stored in the kinetic energy storing device is of a predetermined level or lower, the regenerative driving of the second motor/generator is stopped or is suppressed, and the first motor/generator is driven for power running by receiving electric energy of the electric energy storing device.

The twelfth aspect provides, based on the second aspect, the vehicle driving system, further including:

an electric energy storing device (e.g., a battery BATT in embodiment) which is electrically connected with the first motor/generator and the second motor/generator, wherein, when the vehicle is driven by the first wheel which rotates by receiving power from the first motor/generator and the second wheel which rotates by receiving power from the second motor/generator, the first engaging/disengaging unit is released, while the second engaging/disengaging unit is applied.

The thirteenth aspect provides, based on the second aspect, the vehicle driving system, further including:

an engaging/disengaging unit controller (e.g., a controller C/U in embodiment) which controls the first engaging/disengaging unit and the second engaging/disengaging unit, wherein the engaging/disengaging unit controller executes switching between a first state in which the first engaging/disengaging unit is released, while the second engaging/disengaging unit is applied and a second state in which the first engaging/disengaging unit is applied, while the second engaging/disengaging unit is released.

The fourteenth aspect provides, based on the thirteenth aspect, the vehicle driving system, wherein the engaging/disengaging unit controller includes an operating element movable to a first position corresponding to the first state and to a second position corresponding to the second state.

The fifteenth aspect provides, based on any one of the first to fourteenth aspects, the vehicle driving system, further including:

a third engaging/disengaging unit (e.g., a third clutch CL3 in embodiment) which is provided on a power transmission path between the first wheel and the first motor/generator and which engages or disengages a side of the first wheel and a side of the first motor/generator by being applied or released.

The sixteenth aspect provides, based on the first aspect, the vehicle driving system, wherein the first motor/generator is further mechanically connected with the kinetic energy storing device.

The seventeenth aspect provides, based on the sixteenth aspect, the vehicle driving system, further including:

a first engaging/disengaging unit (e.g., a first clutch CL1 in embodiment) which is provided on a power transmission path between the second motor/generator and the kinetic energy storing device and which engages or disengages a side of the second motor/generator and a side of the kinetic energy storing device by being applied or released;

a second engaging/disengaging unit (e.g., a second clutch CL2 in embodiment) which is provided on a power transmission path between the second motor/generator and the second wheel and which engages or disengages a side of the second motor/generator and a side of the second wheel by being applied or released;

a third engaging/disengaging unit (e.g., a third clutch CL3 in embodiment) which is provided on a power transmission path between the first motor/generator and the first wheel and which engages or disengages a side of the first motor/generator and a side of the first wheel by being applied or released; and a fourth engaging/disengaging unit (e.g., a fourth clutch CL4 in embodiment) which is provided on a power transmission path between the first motor/generator and the kinetic energy storing device and which engages or disengages a side of the first motor/generator and a side of the kinetic energy storing device by being applied or released.

The eighteenth aspect provides, based on the sixteenth aspect, the vehicle driving system, wherein, when a first vehicle energy recovery control is executed in which the energy of the vehicle is recovered by driving only the first motor/generator for regeneration, the third engaging/disengaging unit is applied and the first motor/generator is driven for regeneration, while the first engaging/disengaging unit is applied and the second motor/generator is driven for power running, and wherein, when a second vehicle energy recovery control is executed in which the energy of the vehicle is recovered by driving only the second motor/generator for regeneration, the second engaging/disengaging unit is applied and the second motor/generator is driven for regeneration, while the fourth engaging/disengaging unit is applied and the first motor/generator is driven for power running.

The nineteenth aspect provides, based on the seventeenth aspect, the vehicle driving system, further including:

an electric energy storing device (e.g., a battery BATT in embodiment) which is electrically connected with the first motor/generator and the second motor/generator, wherein, when a third vehicle energy recovery control is executed in which the energy of the vehicle is recovered by driving the first motor/generator and the second motor/generator for regeneration, the third engaging/disengaging unit is applied, the fourth engaging/disengaging unit is released and the first motor/generator is driven for regeneration, while the second engaging/disengaging unit is applied, the first engaging/disengaging unit is released and the second motor/generator is driven for regeneration.

The twentieth aspect provides, based on seventeenth aspect, the vehicle driving system, wherein, when a first vehicle drive control is executed in which the vehicle is driven by the first wheel which rotates by receiving power from the first motor/generator, the first engaging/disengaging unit is applied and the second motor/generator is driven for regeneration, while the third engaging/disengaging unit is applied and the first motor/generator is driven for power running, wherein, when a second vehicle drive control is executed in which the vehicle is driven by the second wheel which rotates by receiving power from the second motor/generator, the fourth engaging/disengaging unit is applied and the first motor/generator is driven for regeneration, while the second engaging/disengaging unit is applied and the second motor/generator is driven for power running.

The twenty first aspect provides, based on the seventeenth aspect, the vehicle driving system, further including:

an electric energy storing device (e.g., a battery BATT in embodiment) which is electrically connected with the first motor/generator and the second motor/generator, wherein, when a third vehicle drive control is executed in which the vehicle is driven by driving the first motor/generator and the second motor/generator for power running, the third engaging/disengaging unit is applied, the fourth engaging/disengaging unit is released and the first motor/generator is driven for power running, while the second engaging/disengaging unit is applied, the first engaging/disengaging unit is released and the second motor/generator is driven for power running.

The twenty second aspect provides, based on the sixteenth aspect, the vehicle driving system, wherein rotational shafts of the first motor/generator, the second motor/generator and the kinetic energy storing devices are disposed coaxially with one another.

The twenty third aspect provides, based on the second aspect, the vehicle driving system, further including:

another kinetic energy storing device (e.g., a second flywheel FW2 in embodiment) which is different from the kinetic energy storing device, wherein the first motor/generator is further mechanically connected with the another kinetic energy storing device.

The twenty fourth aspect provides, based on the twenty third aspect, the vehicle driving system, further including:

a first engaging/disengaging unit (e.g., a first clutch CL1 in embodiment) which is provided on a power transmission path between the second motor/generator and the kinetic energy storing device and which engages or disengages a side of the second motor/generator and a side of the kinetic energy storing device by being applied or released;

a second engaging/disengaging unit (e.g., a second clutch CL2 in embodiment) which is provided on a power transmission path between the second motor/generator and the second wheel and which engages or disengages a side of the second motor/generator and a side of the second wheel by being applied or released;

a third engaging/disengaging unit (e.g., a third clutch CL3 in embodiment) which is provided on a power transmission path between the first motor/generator and the first wheel and which engages or disengages a side of the first motor/generator and a side of the first wheel by being applied or released; and a fourth engaging/disengaging unit (e.g., a fourth clutch CL4 in embodiment) which is provided on a power transmission path between the first motor/generator and the another kinetic energy storing device and which engages or disengages a side of the first motor/generator and a side of the another kinetic energy storing device by being applied or released.

The twenty fifth aspect provides, based on the twenty fourth aspect, the vehicle driving system, wherein, when a first vehicle energy recovery control is executed in which the energy of the vehicle is recovered by driving only the first motor/generator for regeneration, the third engaging/disengaging unit is applied and the first motor/generator is driven for regeneration, while the first engaging/disengaging unit is applied and the second motor/generator is driven for power running, and wherein, when a second vehicle energy recovery control is executed in which the energy of the vehicle is recovered by driving only the second motor/generator for regeneration, the second engaging/disengaging unit is applied and the second motor/generator is driven for regeneration, while the fourth engaging/disengaging unit is applied and the first motor/generator is driven for power running.

The twenty sixth aspect provides, based on the eighteenth or twenty fifth aspect, the vehicle driving system, wherein an estimated regeneration amount resulting when the first motor/generator is driven for regeneration by receiving power from the first wheel and another estimated regeneration amount resulting when the second motor/generator is driven for regeneration by receiving power from the second wheel are compared, and wherein, when the estimated regeneration amount is larger, the first vehicle energy recovery is executed, and when the another estimated regeneration amount is larger, the second vehicle energy recovery control is executed.

The twenty seventh aspect provides, based on the eighteenth or twenty fifth aspect, the vehicle driving system, further including:

an electric energy storing device (e.g., a battery BATT in embodiment) which is electrically connected with the first motor/generator and the second motor/generator, wherein, when the energy stored in the kinetic energy storing device is of a predetermined level or higher, the first engaging/disengaging unit is released and the driving of the second motor/generator for power running is stopped or is suppressed, or the fourth engaging/disengaging unit is released and the driving of the first motor/generator for power running is stopped or is suppressed.

The twenty eighth aspect provides, based on the eighteenth or twenty fifth aspect, the vehicle driving system, wherein, when the first vehicle energy recovery control is executed, the fourth engaging/disengaging unit is released and the second engaging/disengaging unit is released, and wherein, when the second vehicle energy recovery control is executed, the first engaging/disengaging unit is released and the third engaging/disengaging unit is released.

The twenty ninth aspect provides, based on the twenty fourth aspect, the vehicle driving system, wherein, when a first vehicle drive control is executed in which the vehicle is driven by the first wheel which rotates by receiving power from the first motor/generator, the first engaging/disengaging unit is applied, the second motor/generator is driven for regeneration, the third engaging/disengaging unit is applied, and the first motor/generator is driven for power running, and wherein, when a second vehicle drive control is executed in which the vehicle is driven by the second wheel which rotates by receiving power from the second motor/generator, the fourth engaging/disengaging unit is applied, the first motor/generator is driven for regeneration, the second engaging/disengaging unit is applied, and the second motor/generator is driven for power running.

The thirtieth aspect provides, based on the twentieth or twenty ninth aspect, the vehicle driving system, wherein, of the first wheel which rotates by receiving power from the first motor/generator and the second wheel which rotates by receiving power from the second motor/generator, when the first wheel is easier to slip, the second vehicle drive control is executed, and when the second wheel is easier to slip, the first vehicle drive control is executed.

The thirty first aspect provides, based on the twentieth or twenty ninth aspect, the vehicle driving system, wherein, when the first vehicle drive control is executed, the second engaging/disengaging unit is released and the fourth engaging/disengaging unit is released, and wherein, when the second vehicle drive control is executed, the third engaging/disengaging unit is released, and the first engaging/disengaging unit is released.

The thirty second aspect provides, based on the twenty fourth aspect, the vehicle driving system, further including:

an electric energy storing device (e.g., a battery BATT in embodiment) which is electrically connected with the first motor/generator and the second motor/generator, wherein, when a third vehicle energy recovery control is executed in which the energy of the vehicle is recovered by driving the first motor/generator and the second motor/generator are driven for regeneration, the third engaging/disengaging unit is applied, the fourth engaging/disengaging unit is released and the first motor/generator is driven for regeneration, while the second engaging/disengaging unit is applied, the first engaging/disengaging unit is released and the second motor/generator is driven for regeneration.

The thirty third aspect provides, based on the twenty fourth aspect, the vehicle driving system, further including:

an electric energy storing device (e.g., a battery BATT in embodiment) which is electrically connected with the first motor/generator and the second motor/generator, wherein, when a third vehicle drive control is executed in which the vehicle is driven by driving the first motor/generator and the second motor/generator for power driving, the third engaging/disengaging unit is applied, the fourth engaging/disengaging unit is released and the first motor/generator is driven for power running, while the second engaging/disengaging unit is applied, the first engaging/disengaging unit is released and the second motor/generator is driven for power running.

The thirty fourth aspect provides, based on the twenty third aspect, the vehicle driving system, wherein a rotational shaft of the kinetic energy storing device and the another kinetic energy storing device are disposed on different straight lines.

The thirty fifth aspect provides, based on any one of the first to thirty fourth aspects, the vehicle driving system, wherein the first wheel and the second wheel are disposed in a longitudinal direction of the vehicle.

The thirty sixth aspect provides, based on any one of the fifth to eighth, the tenth to twelfth, the nineteenth, the twenty first and the twenty seventh aspects, the vehicle driving system, wherein the electric energy storing device includes a secondary battery (e.g., a battery in embodiment) and can be charged by a charger outside the vehicle.

The thirty seventh aspect provides, based on the thirty sixth aspect, the vehicle driving system, further including:

an electric energy generating device (e.g., a fuel cell in embodiment) disposed in parallel to the electric energy storing device.

The thirty eighth aspect provides, based on any one of the first to thirty seventh aspects, the vehicle driving system, further including:

a prime mover which is mechanically connected with either of the first wheel and the second wheel.

Advantage of the Invention

According to the first aspect, by making use of the motor/generator which is conventionally used to store energy in the kinetic energy storing device, the numbers of driving wheels and wheels for regenerative braking can be increased without increasing the number of motor/generators. Namely, since the first and second motor/generators which are connected to the different wheels can be controlled separately and independently, the roadability and efficiency of the vehicle can be enhanced.

According to the second aspect, the second motor/generator can be connected with the second wheel and the kinetic energy storing device so as to be engaged or disengaged upon situations. Thus, with the second motor/generator, the energy of the vehicle can be regenerated as required, or the kinetic energy can be stored in the kinetic energy storing device as required.

According to the third aspect, the kinetic energy of the vehicle can be stored in the kinetic energy storing device by way of the first wheel, the first motor/generator, the second motor/generator and the first engaging/disengaging unit mechanically or electrically.

According to the fourth aspect, the occurrence of a situation is prevented in which the second motor/generator which is driven for power running by receiving the regenerative electric power of the first motor/generator is disturbed by the dragging of the second wheel, and therefore, the energy can be stored in the kinetic energy storing device more efficiently.

According to the fifth aspect, the storing location where to store the energy regenerated in the first motor/generator and/or the second motor/generator is added to the kinetic energy storing device for selection. The storing location so added can be a supplementary energy supply source when the energy stored in the kinetic energy storing device becomes insufficient. Thus, the occurrence of a shortage of energy can also be suppressed, while the recovery of energy is increased.

According to the sixth aspect, when the energy stored in the kinetic energy storing device is of the predetermined level or higher, the first engaging/disengaging unit is released, whereby the storage of energy into the kinetic energy storing device can be suspended, thereby making it possible to restrain the excessive storage of energy in the kinetic energy storing device. At the same time, the driving of the second motor/generator can be stopped or suppressed, whereby the electric power regenerated in the first motor/generator can be stored in the electric energy storing device.

According to the seventh aspect, when the energy stored in the kinetic energy storing device is of the predetermined level or higher, energy can be regenerated not only from the first motor/generator but also from the second motor/generator for storage in the electric energy storing device, whereby a failure in recovering the energy of the vehicle can be suppressed.

According to the eighth aspect, the first motor/generator and the second motor/generator can be driven for regeneration to slow or stop the vehicle, and therefore, a failure in regeneration can be suppressed by slowing or stopping the vehicle in a stable fashion. The drag loss of the second motor/generator which is driven for regeneration is reduced by detaching the kinetic energy storing device, whereby it is possible to recover the energy efficiently.

According to the ninth aspect, the energy stored in the kinetic energy storing device can be transmitted to the first wheel by way of the first engaging/disengaging unit, the second motor/generator, and the first motor/generator mechanically or electrically.

According to the tenth aspect, the storing location where to store the energy regenerated in the first motor/generator and/or the second motor/generator is added to the kinetic energy storing device for selection. The storing location so added can be a supplementary energy supply source when the energy stored in the kinetic energy storing device becomes insufficient. Thus, the occurrence of a shortage of energy can also be suppressed, while the recovery of energy is increased.

According to the eleventh aspect, the first motor/generator can be driven by using the electric energy storing device as the energy source in place of the kinetic energy storing device when the energy stored in the kinetic energy storing device is of the predetermined level or lower, whereby it is possible to suppress the disturbance of the behavior of the vehicle while maintaining the running conditions thereof.

According to the twelfth aspect, since the vehicle can be driven by driving the first motor/generator and the second motor/generator for power driving, it is possible to run the vehicle stably. The drag loss of the second motor/generator which is driven for power running is reduced by detaching the kinetic energy storing device, whereby it is possible to transmit the energy efficiently.

According to the thirteenth aspect, since the first engaging/disengaging unit and the second engaging/disengaging unit are not applied simultaneously, it is possible to control the two engaging/disengaging unit with a single switching unit such as an actuator.

According to the fourteenth aspect, since the single operating element should be provided for the first engaging/disengaging unit and the second engaging/disengaging unit, it is possible to reduce the number of constituent components.

According to the fifteenth aspect, it is possible to reduce the entrainment loss of the first motor/generator which is transmitted to the first wheel by releasing the third engaging/disengaging unit when the first motor/generator is not driven.

According to the sixteenth aspect, it is possible to reverse the roles of the motor/generator which contributes to the recovery of the energy of the vehicle by being driven for regeneration and the motor/generator which contributes to the storage of kinetic energy by being driven for power running depending upon the conditions of the vehicle or a road surface.

According to the seventeenth aspect, the first motor/generator and the second motor/generator can be engaged with or disengaged from the first wheel or the second wheel and the kinetic energy storing device according to situations, and it is possible to regenerate the energy of the vehicle or store kinetic energy into the kinetic energy storing device as required by using the first motor/generator and the second motor/generator.

According to the eighteenth aspect, also when the energy of the vehicle is recovered by either of the first motor/generator and the second motor/generator, it is possible to store the energy in the kinetic energy storing device as required.

According to the nineteenth aspect, since the brakes can be applied by driving the first motor/generator and the second motor/generator for regeneration, it is possible to slow or stop the vehicle stably, whereby it is possible to suppress the failure of regeneration. The drag loss of the second motor/generator which is driven for regeneration is reduced by detaching the kinetic energy storing device, whereby it is possible to recover the energy efficiently.

According to the twentieth aspect, also when the vehicle is driven by either of the first motor/generator and the second motor/generator, it is possible to supply the energy in the kinetic energy storing device as required.

According to the twenty first aspect, since the vehicle can be driven by driving the first motor/generator and the second motor/generator for power driving, it is possible to run the vehicle stably. The drag loss of the second motor/generator which is driven for power running is reduced by detaching the kinetic energy storing device, whereby it is possible to transmit the energy efficiently.

According to the twenty second aspect, it is possible to realize a radial reduction in size.

According to the twenty third aspect, it is possible to reverse the roles of the motor/generator which contributes to the recovery of the energy of the vehicle by being driven for regeneration and the motor/generator which contributes to the storage of kinetic energy by being driven for power running depending upon the conditions of the vehicle or a road surface.

According to the twenty fourth aspect, the first motor/generator and the second motor/generator can be engaged with or disengaged from the first wheel or the second wheel and the kinetic energy storing device according to situations, and it is possible to regenerate the energy of the vehicle or store kinetic energy into the kinetic energy storing device as required by using the first motor/generator and the second motor/generator.

According to the twenty fifth aspect, also when the energy of the vehicle is recovered by either of the first motor/generator and the second motor/generator, it is possible to store the energy in the kinetic energy storing device as required.

According to the twenty sixth aspect, the regeneration can be executed by using either the first motor/generator or the second motor/generator which regenerates more, thereby making it possible to recover more the kinetic energy of the vehicle.

According to the twenty seventh aspect, when the energy stored in the kinetic energy storing device is of the predetermined level or higher, it is possible to store the energy of the vehicle in the electric energy storing device as electric energy, thereby making it possible to suppress the failure in recovering the energy of the vehicle.

According to the twenty eighth aspect, the drag loss of the kinetic energy storing device with respect to the motor/ generator which is driven for power running and the drag loss of the first wheel with respect to the motor/generator which is driven for power running are eliminated, and therefore, it is possible to store energy in the kinetic energy storing device efficiently.

According to the twenty ninth aspect, also when the vehicle is driven by either of the first motor/generator and the second motor/generator, it is possible to supply the energy in the kinetic energy storing device as required.

According to the thirtieth aspect, the running stability and roadability of the vehicle are enhanced by driving the vehicle by either the first wheel or the second wheel which are difficult to slip.

According to the thirty first aspect, the drag loss of the first wheel with respect to the motor/generator which is driven for regeneration and the drag loss of the kinetic energy storing device with respect to the motor/generator which is driven for power running are eliminated, and therefore, it is possible to drive the vehicle more efficiently.

According to the thirty second aspect, since the brakes can be applied by driving the first motor/generator and the second motor/generator for regeneration, it is possible to slow or stop the vehicle stably, whereby it is possible to suppress the failure of regeneration. The drag loss of the second motor/generator which is driven for regeneration is reduced by detaching the kinetic energy storing device, whereby it is possible to recover the energy efficiently.

According to the thirty third aspect, since the vehicle can be driven by driving the first motor/generator and the second motor/generator for power running, it is possible to run the vehicle stably. The drag loss of the first motor/generator and the second motor/generator which is driven for power running is reduced by detaching the kinetic energy storing device, whereby it is possible to transmit the energy efficiently.

According to the thirty fourth aspect, the degree in freedom in the layout of the kinetic energy storing devices and the motor/generators is enhanced.

According to the thirty fifth aspect, since the first motor/generator is connected to either of the front wheels and the rear wheels and the second motor/generator is connected to the other of the front wheels and the rear wheels, it is possible to exert the braking force and the driving force on the front and rear wheels stably, thereby making it possible to enhance the stability, turning performance and roadability of the vehicle.

According to the thirty sixth aspect, when the energy stored in the kinetic energy storing device becomes insufficient, charging can be executed by using other energy than the regenerated energy of the vehicle.

According to the thirty seventh aspect, when the energy stored in the kinetic energy storing device becomes insufficient, it is possible to generate electric power as required.

According to the thirty eighth aspect, the vehicle can be driven as a parallel hybrid electric vehicle, thereby making it possible to drive the vehicle with good efficiency according to the conditions of the vehicle, the conditions of the electric energy storing device, and the like.

BRIEF DESCRIPTION OF DRAWINGS

FIG. 2 shows block diagrams illustrating states of clutches and flows of torque when a vehicle runs normally in the first embodiment, in which (a) depicts states of the clutches and a flow of torque when the vehicle runs in front-wheel drive (2WD), (b) depicts states of the clutches and a flow of torque when the vehicle runs in rear-wheel drive (2WD), and (c) depicts states of the clutches and flows of torque when the vehicle runs in four-wheel drive (4WD).

FIG. 3 shows block diagrams illustrating states of the clutches and flows of torque when a regenerative braking is executed in the first embodiment, in which (a) depicts states of the clutches and flows of torque when energy is stored in FW (regeneration amount≤FW storage capacity), and (b) depicts states of the clutches and flows of torque when BATT is charged (regeneration amount>FW storage capacity).

FIG. 13 shows block diagrams illustrating states of clutches and flows of torque when a vehicle runs normally in the third embodiment, in which (a) depicts states of the clutches and a flow of torque when the vehicle runs in front-wheel drive (2WD), (b) depicts states of the clutches and a flow of torque when the vehicle runs in rear-wheel drive (2WD), and (c) depicts states of the clutches and flows of torque when the vehicle runs in four-wheel drive (4WD).

FIG. 14 shows block diagrams illustrating states of the clutches and flows of torque when a regenerative braking is executed in the third embodiment, in which (a) depicts states of the clutches and flows of torque when energy is stored in FW {(regeneration amount≤FW storage capacity)+(DS1 estimated regeneration amount>DS2 estimated regeneration amount)}, (b) depicts states of the clutches and flows of torque when energy is stored in FW {(regeneration amount≤FW storage capacity)+(DS1 estimated regeneration amount<DS2 estimated regeneration amount)}, and (c)

depicts states of the clutches and flows of torque when BATT is charged (regeneration amount>FW storage capacity).

FIG. 15 shows block diagrams depicting states of the clutches and flows of torque when energy in the flywheel FW is discharged in the third embodiment, in which (a) depicts states of the clutches and flows of torque when DS1 estimated slip amount<DS2 estimated slip amount, and (b) depicts states of the clutches and flows of torque when DS1 estimated slip amount>DS2 estimated slip amount.

Figure 16:
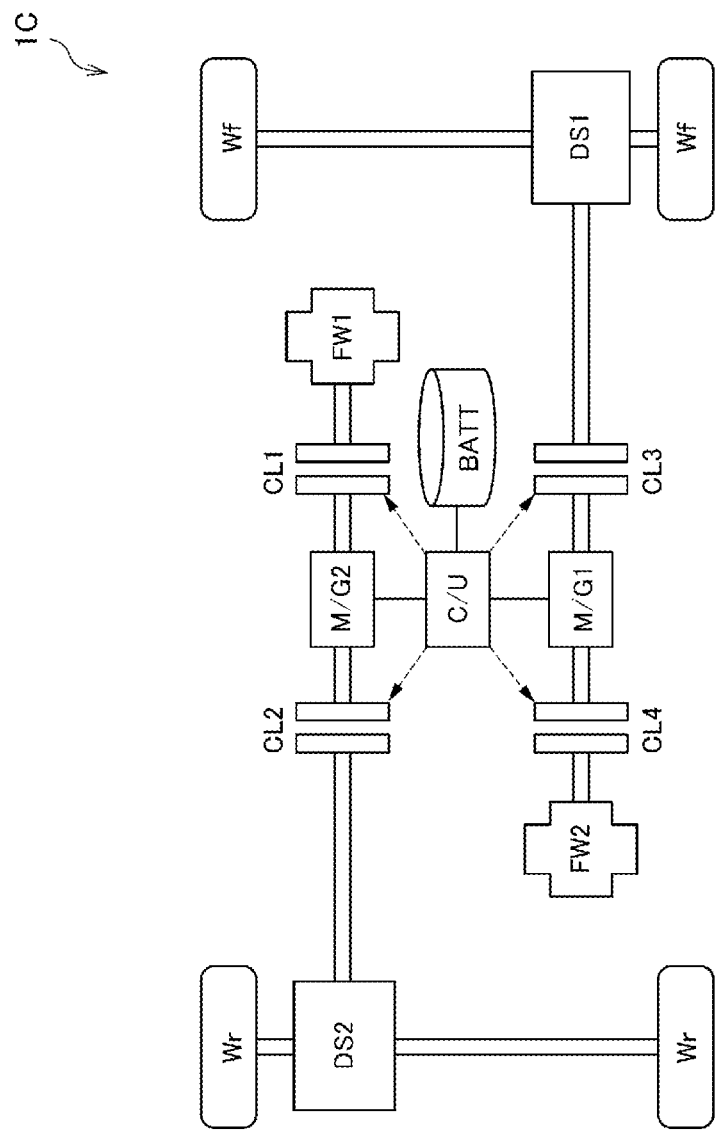

FIG. 16 is a block diagram showing a schematic configuration of a vehicle driving system of a fourth embodiment according to the invention.

FIG. 17 shows block diagrams illustrating states of clutches and flows of torque when a vehicle runs normally in the fourth embodiment, in which (a) depicts states of the clutches and flows of torque when the vehicle runs in front-wheel drive (2WD), (b) depicts states of the clutches and a flow of torque when the vehicle runs in rear-wheel drive (2WD), and (c) depicts states of the clutches and flows of torque when the vehicle runs in four-wheel drive (4WD).

FIG. 18 shows block diagrams illustrating states of the clutches and flows of torque when a regenerative braking is executed in the fourth embodiment, in which (a) depicts states of the clutches and flows of torque when energy is stored in FW {(regeneration amount≤FW storage capacity)+(DS1 estimated regeneration amount>DS2 estimated regeneration amount)}, (b) depicts states of the clutches and flows of torque when energy is stored in FW {(regeneration amount≤FW storage capacity)+(DS1 estimated regeneration amount<DS2 estimated regeneration amount)}, and (c) depicts states of the clutches and flows of torque when BATT is charged (regeneration amount>FW storage capacity).

FIG. 19 shows block diagrams depicting states of the clutches and flows of torque when energy in the flywheel FW is discharged in the fourth embodiment, in which (a) depicts states of the clutches and flows of torque when DS1 estimated slip amount<DS2 estimated slip amount, and (b) depicts states of the clutches and flows of torque when DS1 estimated slip amount>DS2 estimated slip amount.

Figure 20:
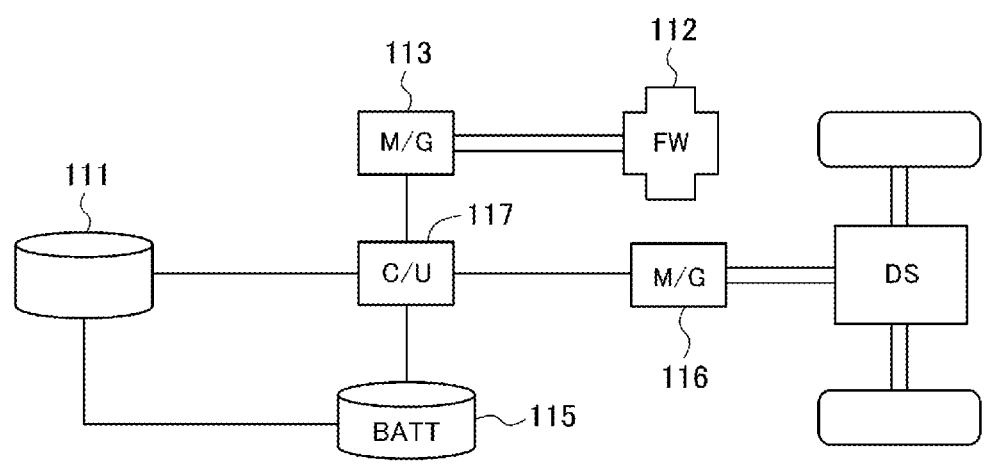

FIG. 20 is a block diagram of a hybrid vehicle of Patent Literature 1.

Figure 21:
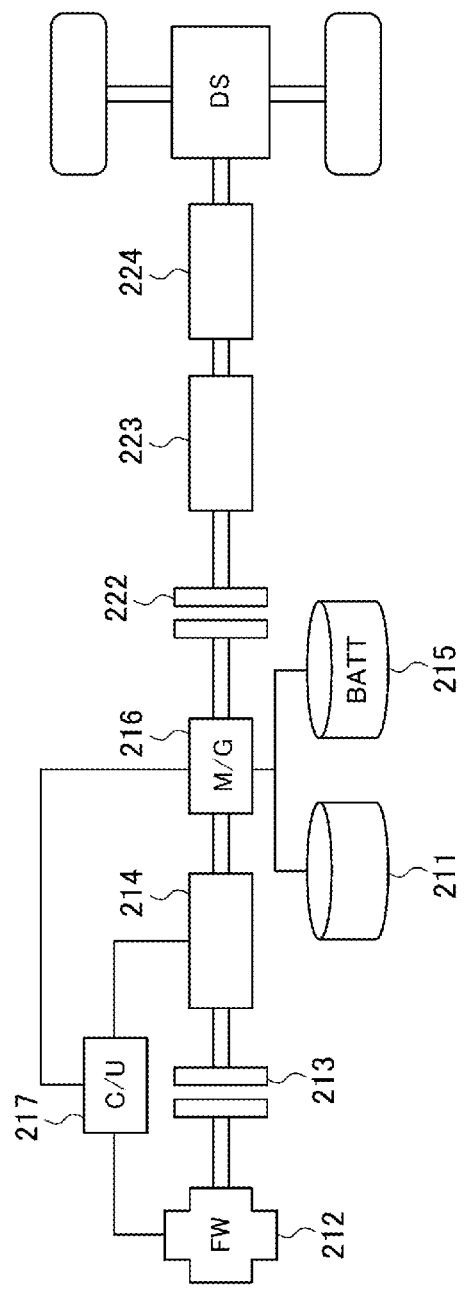

FIG. 21 is a block diagram of a hybrid vehicle of Patent Literature 2.

MODE FOR CARRYING OUT THE INVENTION

Firstly, embodiments of vehicle driving systems according to the invention will be described based on the drawings.

First Embodiment

Figure 1:
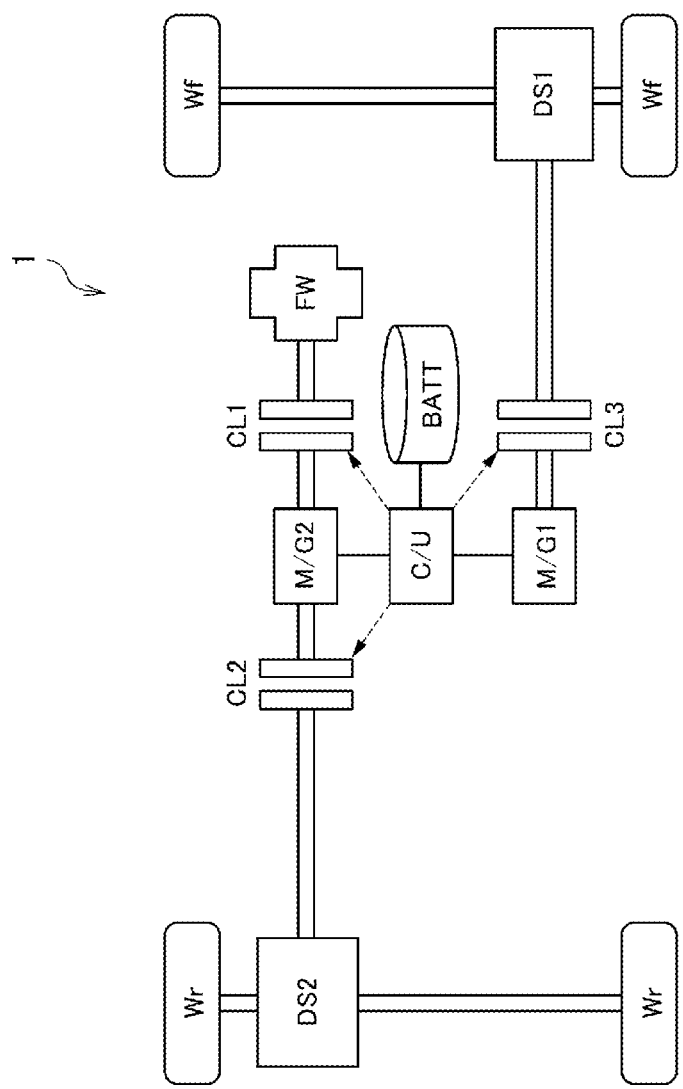
FIG. 1 is a block diagram showing a schematic configuration of a vehicle driving system of a first embodiment according to the invention.

FIG. 1 is a block diagram showing a schematic configuration of a vehicle driving system of a first embodiment according to the invention.

In a vehicle driving system 1 of this embodiment, a first motor/generator M/G1 is mechanically connected to a drive shaft DS1 which is coupled to either of front wheels Wf and rear wheels Wr, and a second motor/generator M/G2 is mechanically connected to a drive shaft DS2 which is coupled to the other wheels. The second motor/generator M/G2 is also mechanically connected to a flywheel FW which stores kinetic energy, and rotational shafts of the second motor/generator M/G2 and the flywheel FW are disposed coaxially in a longitudinal direction of a vehicle. This embodiments and the embodiments described later are described on the assumption that the drive shaft DS1 is connected to the front wheels Wf and the drive shaft DS2 is connected to the rear wheels Wr, but the drive shaft DS1 may be connected to the rear wheels Wr and the drive shaft DS2 may be connected to the front wheels Wf.

A first clutch CL1 is provided on a power transmission path between the second motor/generator M/G2 and the flywheel FW, and a second clutch CL2 is provided on a power transmission path between the second motor/generator M/G2 and the drive shaft DS2. A third clutch CL3 is provided on a power transmission path between the first motor/generator M/G1 and the drive shaft DS1. In this embodiment, the third clutch CL3 does not necessarily have to be provided, and the first motor/generator M/G1 and the drive shaft DS1 may be coupled directly to each other.

Consequently, the second motor/generator M/G2 and the flywheel FW are engaged or disengaged by applying or releasing the first clutch CL1. The second motor/generator M/G2 and the drive shaft DS2 are engaged or disengaged by applying or releasing the second clutch CL2. The first motor/generator M/G1 and the drive shaft DS1 are engaged or disengaged by applying or releasing the third clutch CL3.

In the vehicle driving system 1 in which its constituent components are mechanically connected in the way described above, electric energy which is transmitted to the second motor/generator M/G2 can be stored in the flywheel FW as kinetic energy by applying the first clutch CL1, and the kinetic energy stored in the flywheel FW can be converted into electric energy in the second motor/generator M/G2.

Since the second motor/generator M/G2 is connected to the drive shaft DS2 by way of the second clutch CL2, a driving force can be transmitted to the rear wheels Wr which are coupled to the drive shaft DS2 by applying the second clutch CL2 and driving the second motor/generator M/G2 for power running. A braking force can be exerted on the rear wheels Wr which are coupled to the drive shaft DS2 by driving the second motor/generator M/G2 for regeneration.

Since the first motor/generator M/G1 is connected to the drive shaft DS1 by way of the third clutch CL3, a driving force can be transmitted to the front wheels Wf which are coupled to the drive shaft DS1 by applying the third clutch CL3 and driving the first motor/generator M/G1 for power running. A braking force can be exerted on the front wheels Wf which are coupled to the drive shaft DS1 by driving the first motor/generator M/G1 for regeneration.

Further, the first motor/generator M/G1 and the second motor/generator M/G2 are electrically connected to each other via a controller C/U. Further, a battery BATT is installed in the vehicle driving system 1 and is controlled by the controller C/U. The battery BATT may be a rechargeable battery (a secondary battery) or may be made up of both a rechargeable battery and a fuel cell. Consequently, since the first motor/generator M/G1, the second motor/generator M/G2 and the battery BATT are electrically connected to each other via the controller C/U, electric energy can be transferred therebetween.

By this configuration, the electric energy of the first motor/generator M/G1 can be supplied to the second motor/generator M/G2 or can be stored in the battery BATT, the electric energy of the second motor/generator M/G2 can be supplied to the first motor/generator M/G1 or can be stored in the battery BATT, or the electric energy stored in the battery BATT can be supplied to the first motor/generator M/G1 or can be supplied to the second motor/generator M/G2. In the case of the battery BATT being made up of both the rechargeable battery and the fuel cell, electric power generated in the fuel cell can be stored in the rechargeable battery. Since the battery BATT is provided, there is provided a storing location where to store energy regenerated in the first motor/generator M/G1 and/or the second motor/generator M/G2 in addition to the flywheel FW, and this extends the selection of energy storing locations. Since the battery BATT also becomes a supplementary supply source which works when the energy stored in the flywheel FW is insufficient, not only can the recovery of energy be enhanced, but also the occurrence of a shortage of energy can be suppressed. In the following description, the battery BATT will be described as a rechargeable battery which can be charged by being fed by an external charger (not shown).

In addition to the function to control the electrical system of the first motor/generator M/G1, the second motor/generator M/G2 and the battery BATT, the controller C/U functions as an engaging/disengaging unit controller which controls the first to third clutches CL1, CL2, CL3. For example, the controller C/U executes switching between a first state in which the first clutch CL1 is released, while the second clutch CL2 is applied and a second state in which the first clutch CL1 is applied, while the second clutch CL2 is released. Here, the controller C/U does not apply both the first clutch CL1 and the second clutch CL2 at the same time. Consequently, there is no such situation that the drive shaft DS2 and the flywheel FW are connected so that power can be transmitted therebetween, and therefore, there is no need to provide a transmission for matching rotation speeds thereof on a power transmission path between the second motor/generator M/G2 and the flywheel. Further, when the second motor/generator M/G2 is driven for power running or driven for regeneration with the second clutch CL2 applied, since the first clutch CL1 is released, there occurs no drag in the flywheel FW. On the contrary, when the second motor/generator M/G2 is driven for power running or driven for regeneration with the first clutch CL1 applied, since the second clutch CL2 is released, there occurs no drag in the drive shaft DS2. By adopting this configuration, it is possible to transmit and store energy efficiently.

Following this, the control of the vehicle driving system 1 while the vehicle is running will be described.

FIG. 2 shows block diagrams illustrating states of clutches and flows of torque when a vehicle runs normally in the first embodiment, in which (a) depicts states of the clutches and a flow of torque when the vehicle runs in front-wheel drive (2WD), (b) depicts states of the clutches and a flow of torque when the vehicle runs in rear-wheel drive (2WD), and (c) depicts states of the clutches and flows of torque when the vehicle runs in four-wheel drive (4WD). In the drawings, hatched thick arrows denote power-running torque generated by the motor/generators when they are driven for power running, and thick arrows with no hatching denote regenerative torque generated by the motor/generators when they are driven for regeneration, thin arrows denoting a flow of electric power. This will also be the same in FIGS. 3, 4, 13 to 15 and 17 to 19.

When the vehicle runs in front-wheel drive (2WD), as shown in FIG. 2(a), the power-running torque of the first motor/generator M/G1 is transmitted to the drive shaft DS1 by driving the first motor/generator M/G1 for power running with electric energy from the battery BATT such that the first clutch CL1 and the second clutch CL2 are released, while the third clutch CL3 is applied.

When the vehicle runs in rear-wheel drive (2WD), as shown in FIG. 2(b), the power-running torque of the second motor/generator M/G2 is transmitted to the drive shaft DS2 by driving the second motor/generator M/G2 for power running with the electric energy from the battery BATT such that the first clutch CL1 and the third clutch CL3 are released, while the second clutch CL2 is applied.

When the vehicle runs in four-wheel drive (4WD), as shown in FIG. 2(c), the power-running torque of the first motor/generator M/G1 is transmitted to the drive shaft DS1 and the power-running torque of the second motor/generator M/G2 is transmitted to the drive shaft DS2 by driving the first motor/generator M/G1 and the second motor/generator M/G2 for power running with the electric energy from the battery BATT such that the first clutch CL1 is released, while the second clutch CL2 and the third clutch CL3 are applied.

In this way, while the vehicle is running normally, particularly when it is in rear-wheel drive (2WD) and four-wheel drive (4WD), the energy can be transmitted efficiently while reducing the drag loss of the flywheel FW with respect to the second motor/generator M/G2 which is driven for power running by keeping released the first clutch CL1 provided on the power transmission path between the second motor/generator M/G2 and the flywheel FW.

FIG. 3 shows block diagrams illustrating states of the clutches and flows of torque when a regenerative braking is executed in the first embodiment, in which (a) depicts states of the clutches and flows of torque when energy is stored in FW (regeneration amount≤FW storage capacity), and (b) depicts states of the clutches and flows of torque when BATT is charged (regeneration amount>FW storage capacity).

When a regenerative braking is executed, in case a regeneration amount is equal to or less than a storage capacity of the flywheel FW, regenerated energy is stored in the flywheel FW as kinetic energy, whereas in case the regeneration amount exceeds the storage capacity of the flywheel FW, the regenerated energy is stored in the battery BATT as electric energy. The storage capacity of the flywheel FW is set, for example, to a value which is equal to a regeneration amount which results when a vehicle which is running at a vehicle speed of V1 (for example, 60 km/h) is slowed to a halt. V1 can be set to an arbitrary value.

In case the regeneration amount is equal to or less than the storage capacity of the flywheel FW, as shown in FIG. 3(a), the kinetic energy of the drive shaft DS1 is converted into electric energy as regenerative energy of the first motor/generator M/G1 by driving the first motor/generator M/G1 for regeneration and driving the second motor/generator M/G2 for power running such that the second clutch CL2 is released and the first clutch CL1 and the third clutch CL3 are applied. Then, the second motor/generator M/G2 is driven for power running with the electric energy so converted, and kinetic energy of the second motor/generator M/G2 is stored in the flywheel FW. Consequently, the kinetic energy of the vehicle can be stored in the flywheel FW by way of the front wheels Wf, the third clutch CL3, the first motor/generator M/G1, the second motor/generator M/G2, and the first clutch CL1 mechanically or electrically. By keeping released the second clutch CL2 which is provided on the power transmission path between the second motor/generator M/G2 and the drive shaft DS2 in the way described above, a risk is eliminated that the second motor/generator M/G2 which is driven for power running by receiving regenerative electric power of the first motor/generator M/G1 is disturbed by the dragging of the drive shaft DS2. Thus, the energy can be stored in the flywheel FW more efficiently.

In case the regeneration amount exceeds the storage capacity of the flywheel FW, as shown in FIG. 3(b), the regenerative energy from the first motor/generator M/G1 and the second motor/generator M/G2 is converted into electric energy to be stored in the battery BATT by driving the first motor/generator M/G1 for regeneration and driving the second motor/generator M/G2 for regeneration such that the first clutch CL1 is released and the second clutch CL2 and the third clutch CL3 are applied. In this way, when the energy stored in the flywheel FW is of a predetermined level or higher, the regenerative energy is stored in the battery BATT, whereby the vehicle can be slowed stably, thereby making it possible to suppress the failure in recovering the energy of the vehicle. The drag loss of the flywheel FW with respect to the second motor/generator M/G2 which is driven for regeneration can be reduced by detaching the flywheel FW, whereby it is possible to recover the energy efficiently.

Figure 4:
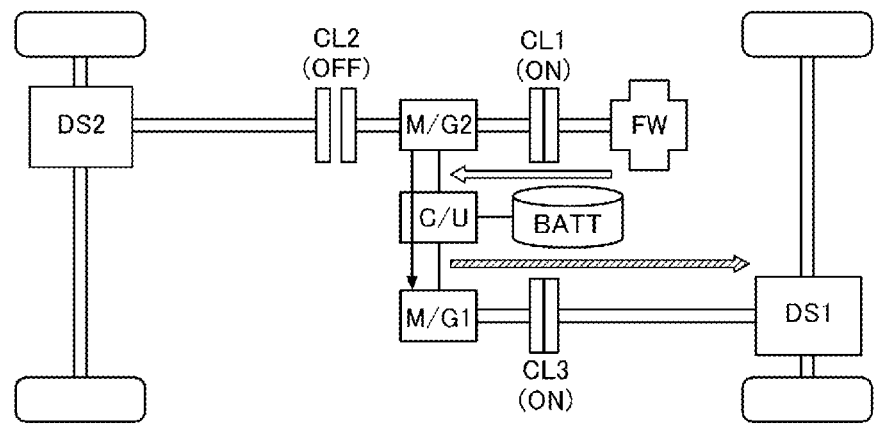
FIG. 4 is a block diagram depicting states of the clutches and flows of torque when energy in the flywheel FW is discharged in the first embodiment.

FIG. 4 is a block diagram depicting states of the clutches and flows of torque when the energy in the flywheel FW is discharged.

In discharging the energy stored in the flywheel FW, the kinetic energy of the flywheel FW is converted into electric energy as regenerative energy of the second motor/generator M/G2 by driving the second motor/generator M/G2 for regeneration and driving the first motor/generator M/G1 for power running such that the second clutch CL2 is released and the first clutch CL1 and the third clutch CL3 are applied. Then, the first motor/generator M/G1 is driven for power running with the electric energy so converted, and the kinetic energy of the first motor/generator M/G1 is transmitted to the drive shaft DS1. This enables the energy stored in the flywheel FW to be transmitted to the front wheels by way of the first clutch CL1, the second motor/generator M/G2, the first motor/generator M/G1, and the third clutch CL3 mechanically or electrically. By keeping released the second clutch CL2 which is provided on the power transmission path between the second motor/generator M/G2 and the drive shaft DS2, a risk is eliminated that the second motor/generator M/G2 which is driven for regeneration is disturbed by the dragging of the drive shaft DS2.

Following this, specific controls carried out in the vehicle equipped with the vehicle driving system 1 while the vehicle is running will be described by taking two different driving modes as examples.

Figure 5:
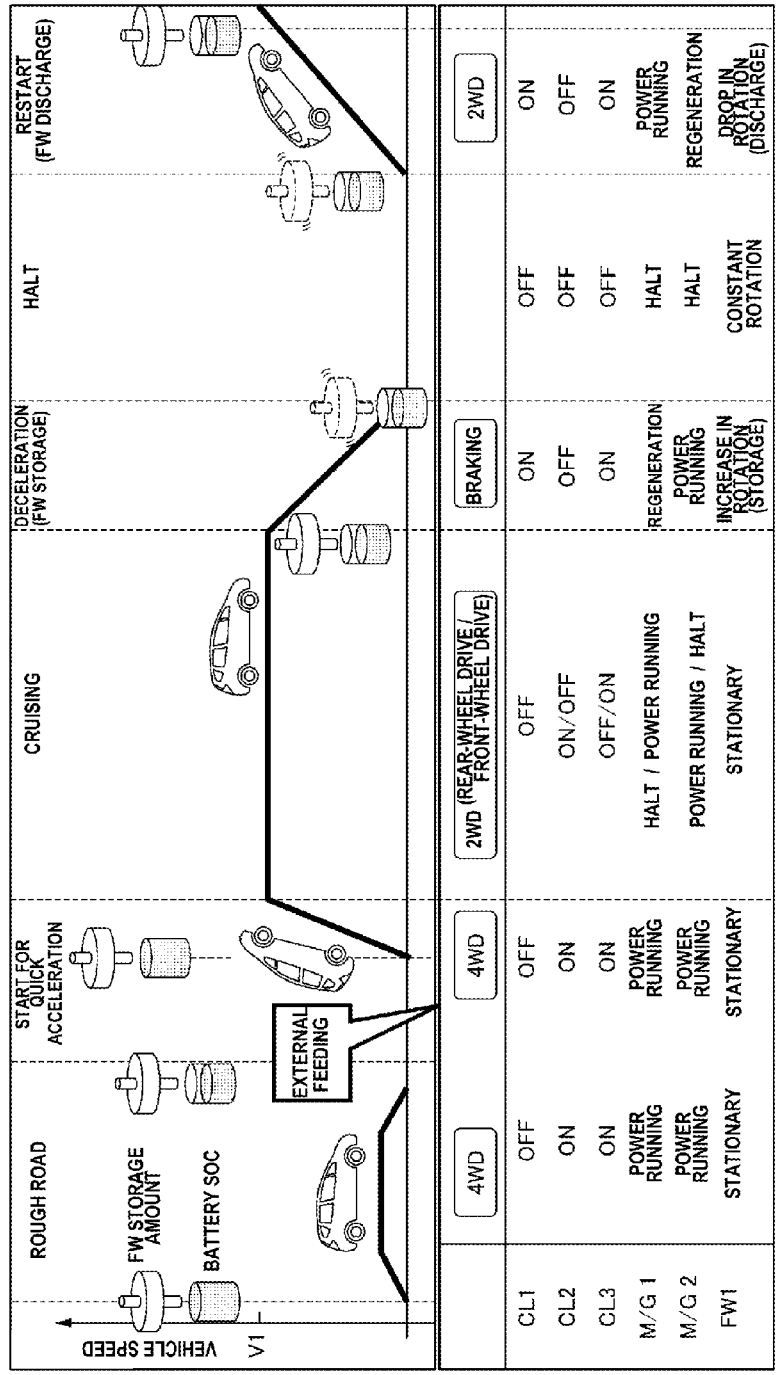
FIG. 5 is a timing chart of a certain driving mode of a vehicle equipped with the vehicle driving system of the first embodiment.

FIG. 5 is a timing chart of a certain driving mode.

Figure 6:
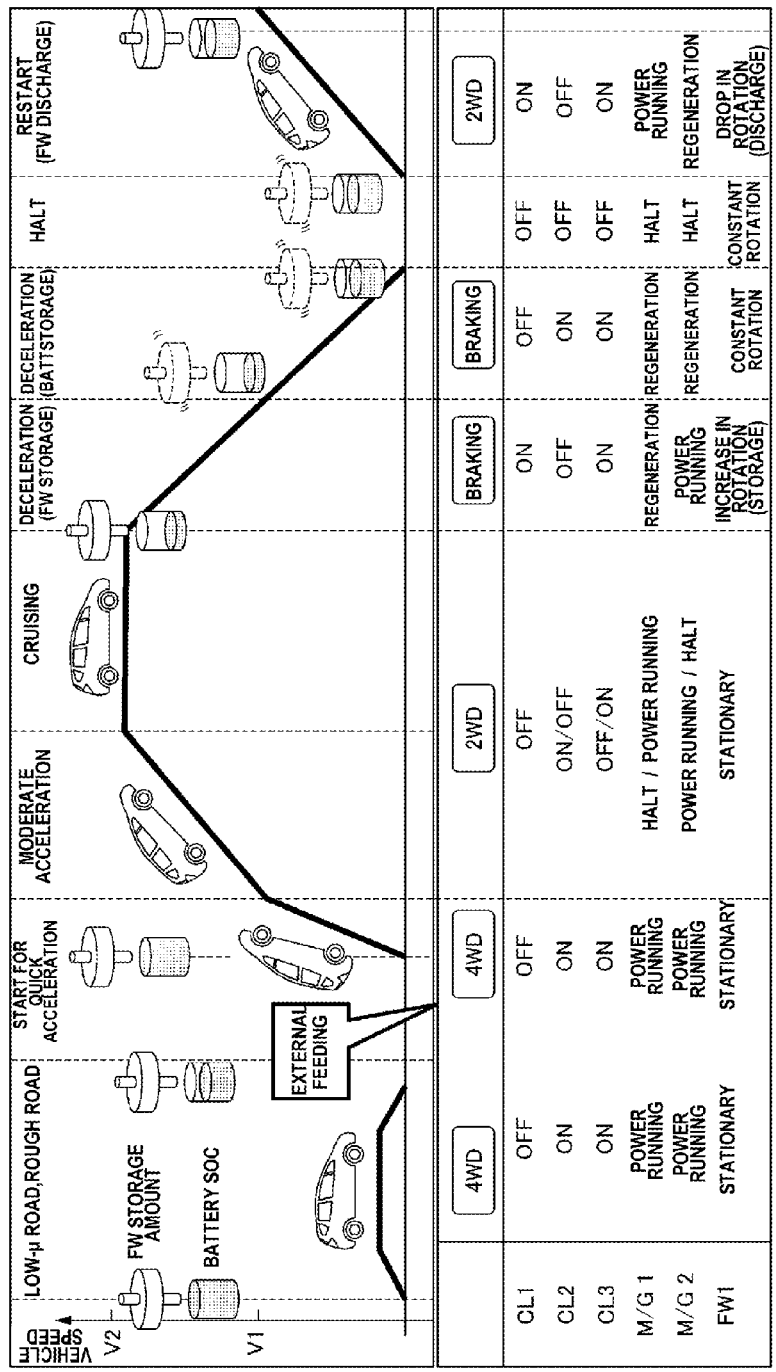
FIG. 6 is a timing chart of a different driving mode of the vehicle equipped with the vehicle driving system of the first embodiment.

This driving mode is based on the assumption that the vehicle runs on a so-called rough road such as a road with a low-friction road surface, stops once, starts from a standstill for quick acceleration after having been fed from an external power supply or charger, cruises at the vehicle speed V1 (for example, 60 km/h), is decelerated, comes to a halt and restarts. In FIGS. 5 and 6, an "FW storage amount" schematically represents the amount of energy stored in the flywheel FW, and a "battery SOC" schematically represents the state of charge (SOC) of the battery BAT.

The vehicle runs in four-wheel drive (4WD) on the rough road. As described above, the power-running torque of the first motor/generator M/G1 is transmitted to the drive shaft DS1 and the power-running torque of the second motor/generator M/G2 is transmitted to the drive shaft DS2 by driving the first motor/generator M/G1 and the second motor/generator M/G2 for power running with the electric energy from the battery BATT such that the first clutch CL1 is released, while the second clutch CL2 and the third clutch CL3 are applied. As this occurs, the battery SOC is reduced. On the other hand, since the first clutch CL1 is released, the flywheel FW is stationary, and no energy is stored therein.

Following this, the vehicle is fed from the external charger while the vehicle is at a halt, whereby the battery SOC which has been consumed as a result of the vehicle having run on the rough road can be recovered. In this state, too, the flywheel FW remains stationary, and no energy is stored therein.

When starting from a standstill for quick acceleration, the vehicle runs in the four-wheel drive (4WD), and when the vehicle speed reaches V1, the vehicle starts to cruise. While cruising, the vehicle runs in the front-wheel drive (2WD) or the rear-wheel drive (2WD). While the vehicle is running in the front-wheel drive (2WD), as shown in FIG. 2(a), the power-running torque from the first motor/generator M/G1 is transmitted to the drive shaft DS1 by driving the first motor/generator M/G1 for power running with the electric energy from the battery BATT such that the first clutch CL1 and the second clutch CL2 are released, while the third clutch CL3 is applied. While the vehicle is running in the rear-wheel drive (2WD), as shown in FIG. 2(b), the power-running torque from the second motor/generator M/G2 is transmitted to the drive shaft DS2 by driving the second motor/generator M/G2 for power running with the electric energy from the battery BATT such that the first clutch CL1 and the third clutch CL3 are released, while the second clutch CL2 is applied.

When the vehicle is decelerated from the cruising at the vehicle speed V1, as shown in FIG. 3(a), the kinetic energy of the drive shaft DS1 is converted into electric energy as regenerative energy of the first motor/generator M/G1 by driving the first motor/generator M/G1 for regeneration and driving the second motor/generator M/G2 for power running such that the second clutch CL2 is released, while the first clutch CL1 and the third clutch CL3 are applied. Then, the second motor/generator M/G2 is driven for power running with the electric energy so converted, and the kinetic energy of the second motor/generator M/G2 is stored in the flywheel FW. As this occurs, since the storage capacity of the flywheel FW is equal to the regeneration amount which results when the vehicle which is running at the vehicle speed V1 is brought to a halt, the kinetic energy of the vehicle is stored in the flywheel FW, while no electric power is stored in the battery BATT. Consequently, the FW storage amount is increased, and the battery SOC is maintained constant.

When the vehicle comes to a halt, in addition to the second clutch CL2, the first clutch CL1 and the third clutch CL3 are also released, and the first motor/generator M/G1 and the second motor/generator M/G2 are stopped. As this occurs, the flywheel FW is rotating constantly, and the kinetic energy continues to be stored therein.

When the vehicle is restarted from this state, the energy stored in the flywheel FW is used. Namely, as shown in FIG. 4, the kinetic energy of the flywheel FW is converted into electric energy as regenerative energy of the second motor/generator M/G2 by driving the second motor/generator M/G2 for regeneration and driving the first motor/generator M/G1 for power running such that the second clutch CL2 is released, while the first clutch CL1 and the third clutch CL3 are applied. Then, the first motor/generator M/G1 is driven for power running with the electric energy so converted, and the kinetic energy of the first motor/generator M/G1 is transmitted to the drive shaft DS1. In this way, by making use of the energy stored in the flywheel FW, the vehicle can be started with the battery SOC remaining constant. The flywheel FW which has discharged its stored energy gradually reduces its rotational momentum and eventually comes to a halt.

Thereafter, when the energy stored in the flywheel FW is reduced to the predetermined level or lower, the four-wheel drive (4WD), the front-wheel drive (2WD) or the rear-wheel drive (2WD) in which the vehicle is driven by receiving the electric power from the battery BATT is selected according to the conditions of the road surface (not shown).

FIG. 6 is a timing chart of a different driving mode.

This driving mode is based on the assumption that the vehicle runs on a so-called rough road such as a road with a low-friction road surface, stops once, starts from a standstill for quick acceleration after having been fed from an external power supply or charger, is accelerated moderately from the vehicle speed V1 (for example, 60 km/h), cruises at a vehicle speed V2 (for example, 100 km/h), is decelerated, comes to a halt and restarts.

In the different driving mode in FIG. 6, operations are different from those performed in the cruising area where the vehicle cruises at the vehicle speed V1 and the decelerated area in the driving mode in FIG. 5, and these different operations will be described.

The vehicle runs in the front-wheel drive (2WD) or the rear-wheel drive (2WD) in a moderate acceleration area where the vehicle is moderately accelerated from the vehicle speed V1 (for example, 60 km/h) and the cruising area where the vehicle cruises at the vehicle speed V2 (for example, 100 km), which is similar to the front-wheel drive (2WD) or the rear-wheel drive (2WD) shown in FIG. 5.

When the vehicle is decelerated from the cruising at the vehicle speed V2, as shown in FIG. 3(a), the kinetic energy of the drive shaft DS1 is converted into electric energy as regenerative energy of the first motor/generator M/G1 by driving the first motor/generator M/G1 for regeneration and the second motor/generator M/G2 for power running such that the second clutch CL2 is released, while the first clutch CL1 and the third clutch CL3 are applied. Then, the second motor/generator M/G2 is driven for power running with the electric energy so converted, and the kinetic energy of the second motor/generator M/G2 is stored in the flywheel FW. As this occurs, since the storage capacity of the flywheel FW is equal to the regeneration amount which results when the vehicle which is running at the vehicle speed V1 is brought to a halt, in the deceleration from the vehicle speed V2, the amount of energy stored in the flywheel FW exceeds the storage capacity of the flywheel FW in the middle of the deceleration. Consequently, at the point in time when the amount of energy stored in the flywheel FW reaches the storage capacity of the flywheel FW, the regenerative energy is caused to be stored in the battery BATT.

When the amount of energy stored in the flywheel FW reaches the storage capacity of the flywheel FW, as shown in FIG. 3(b), the regenerative energy from the first motor/generator M/G1 and the second motor/generator M/G2 is converted into electric energy to be stored in the battery BATT by driving the first motor/generator M/G1 for regeneration and driving the second motor/generator M/G2 for regeneration such that the first clutch CL1 is released, while the second clutch CL2 and the third clutch CL3 are applied. In this way, at the point in time when the amount of energy stored in the flywheel FW reaches the storage capacity of the flywheel FW, the energy storing location is switched from the flywheel FW to the battery BATT, whereby the battery SOC is increased with the kinetic energy of the vehicle kept stored in the flywheel FW, thereby making is possible to suppress the failure in recovering the energy of the vehicle. In what is described above, while the first motor/generator M/G1 and the second motor/generator M/G2 are driven for regeneration such that the first clutch CL1 is released, while the second clutch CL2 and the third clutch CL3 are applied when the amount of energy stored in the flywheel FW reaches the storage capacity of the flywheel FW, only the first motor/generator M/G1 may be driven for regeneration such that the first clutch CL1 is kept released and the second clutch CL2 is kept released. As this occurs, the driving of the second motor/generator M/G2 for power running should be stopped or suppressed more than when the kinetic energy is stored in the flywheel FW.

Thus, as has been described heretofore, according to this embodiment, there are provided the first motor/generator M/G1 which is mechanically connected with the front wheels Wf via the drive shaft DS1, the second motor/generator M/G2 which is electrically connected with the first motor/generator M/G1 and the flywheel FW which is mechanically connected with the second motor/generator M/G2 and which stores kinetic energy therein, and the second motor/generator M/G2 is mechanically connected with the rear wheels Wr via the drive shaft DS2. Thus, by making use of the motor/generators which are conventionally used to store energy in the kinetic energy storing device, it is possible to increase the numbers of driving wheels and wheels for regenerative braking without increasing the number motor/generators. Namely, the four-wheel drive can be executed by the first and second motor/generators M/G1, M/G2, and regeneration can be executed by the front wheels Wf and the rear wheels Wr.

There are provided the first clutch CL1 which is provided on the power transmission path between the second motor/generator M/G2 and the flywheel FW and which engages or disengages a side of the second motor/generator M/G2 and a side of the flywheel FW by being applied or released and the second clutch CL2 which is provided on the power transmission path between the second motor/generator M/G2 and the rear wheels Wr and which engages or disengages a side of the second motor/generator M/G2 and a side of the rear wheels Wf by being applied or released. Therefore, the second motor/generator M/G2 can be engaged with or disengaged from the rear wheels Wr and the flywheel FW according to situations, whereby the regeneration of vehicle energy or the storage of kinetic energy into the flywheel FW can be executed by the second motor/generator M/G2 as required.

There is further provided the third clutch CL3 which is provided on the power transmission path between the front wheels Wf and the first motor/generator M/G1 and which engages or disengages a side of the front wheels Wf and a side of the first motor/generator M/G1 by being applied or released. Therefore, when the first motor/generator M/G1 is not driven, the third clutch CL3 is released, whereby it is possible to reduce the entrainment loss of the first motor/generator M/G1 which is transmitted to the front wheels Wf.

Second Embodiment

Next, a vehicle driving system of a second embodiment according to the invention will be described.

Figure 7:
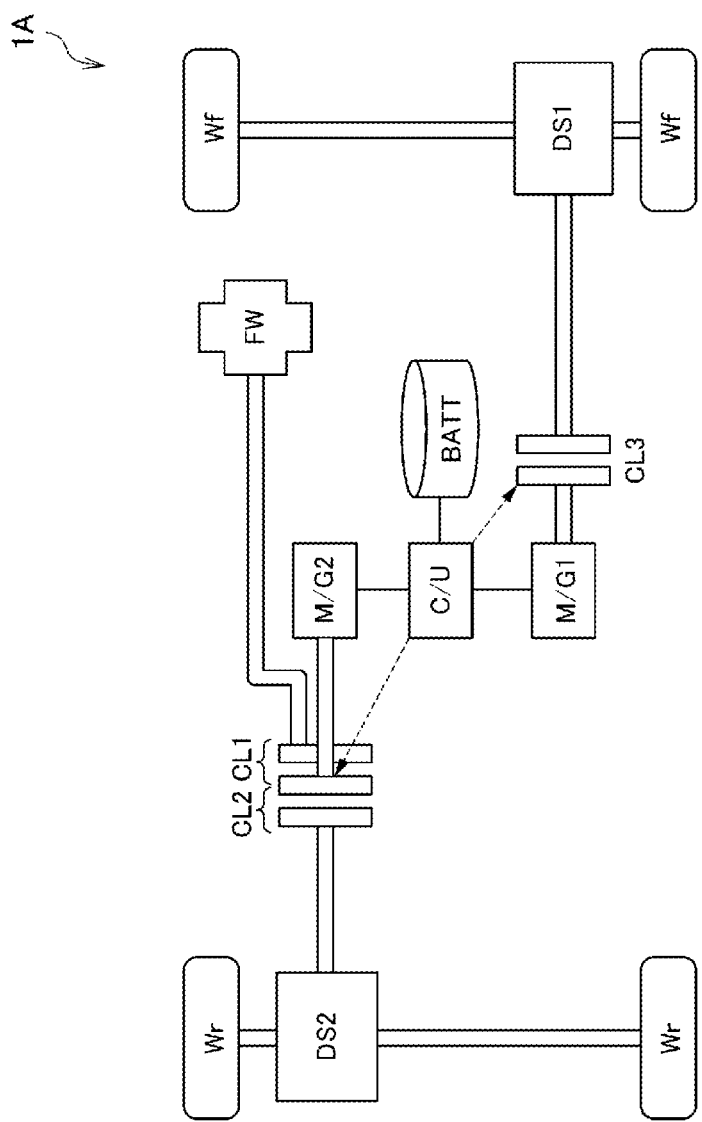
FIG. 7 is a block diagram showing a schematic configuration of a vehicle driving system of a second embodiment according to the invention.

FIG. 7 is a block diagram showing a schematic configuration of a vehicle driving system of a second embodiment according to the invention.

As described with respect to the vehicle driving system 1 of the first embodiment, since there is no such situation that the first clutch CL1 and the second clutch CL2 are engaged simultaneously, in a vehicle driving system 1A of the second embodiment, a configuration is adopted in which a first clutch CL1 and a second clutch CL2 are controlled so as to be applied or released by a single operating element 17. The vehicle driving system 1A of the second embodiment differs from the vehicle driving system 1 of the first embodiment in that the first clutch CL1 and the second clutch CL2 are applied and released by the single operating element 17. However, since the other features of the second embodiment are similar in configuration to those of the first embodiment, like reference numerals will be given to like constituent components to those of the first embodiment, and the description thereof will be omitted. Since driving controls to be executed in the second embodiment are also like to those of the first embodiment, the description thereof will also be omitted here. In first and second examples of the second embodiment, the first and second clutches CL1, CL2 are made up of DOG clutches. In third and fourth examples, the first and second clutches CL1, CL2 are made up of friction clutches.

Figure 8:
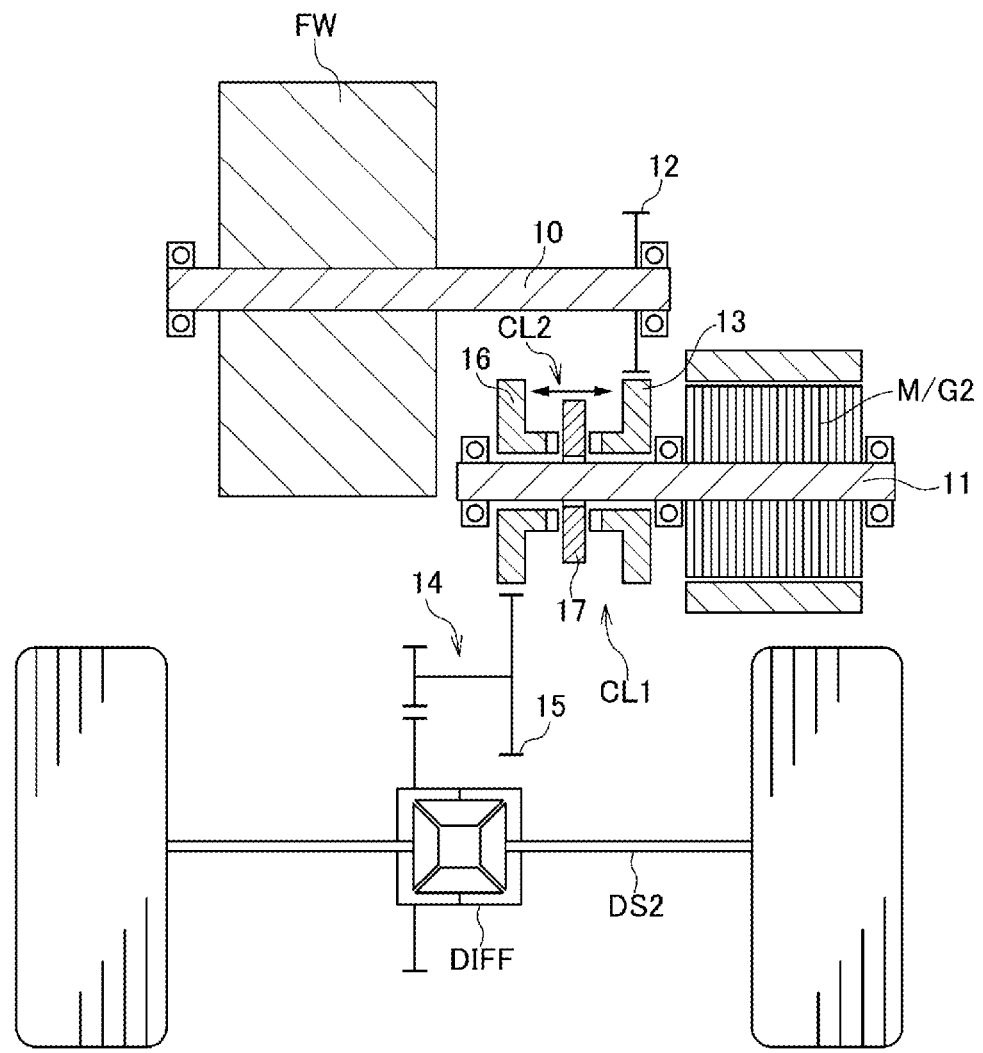
FIG. 8 is a drawing showing a first example of the vehicle driving system 1A of the second embodiment which shows specific configurations of first and second clutches CL1, CL2 and a specific arrangement of a second motor/generator M/G2 and a flywheel FW.

FIG. 8 is a drawing showing a first example of the vehicle driving system 1A of the second embodiment which shows specific configurations of the first and second clutches CL1, CL2 and a specific arrangement of a second motor/generator M/G2 and a flywheel FW.

In the first example, an axis of a cylindrical flywheel FW extends in a widthwise direction of a vehicle, and an axis of a second motor/generator M/G2 extends in the widthwise direction of the vehicle. A flywheel output/input gear 13 which meshes with an input/output gear 12 of a flywheel shaft 10 and a motor input/output gear 16 which meshes with a large-diameter gear 15 of a two-stage pinion 14 which meshes with a differential gear DIFF are disposed around a motor shaft 11 of the motor/generator M/G2 so as not only to rotate relative to the motor shaft 11 but also to face each other in the widthwise direction of the vehicle. The operating element 17 which is mounted on the motor shaft 11 so as to rotate together therewith is disposed between the flywheel output/input gear 13 and the motor shaft input/output gear 16 so as to be moved in the widthwise direction of the vehicle by an actuator, not shown. The first clutch CL1 is made up of this operating element 17 and the flywheel output/input gear 13, and the second clutch CL2 is made up of the operating element 17 and the motor input/output gear 16.

When the operating element 17 is situated in a middle position between the flywheel output/input gear 13 and the motor input/output gear 16, the operating element 17 meshes with neither of the flywheel output/input gear 13 and the motor input/output gear 16 (the first clutch CL1: released, the second clutch CL2: released), the second motor/generator M/G2 and the flywheel FW are disengaged, and the second motor/generator M/G2 and a drive shaft DS2 are disengaged.

When the operating element 17 moves from the middle position between the flywheel output/input gear 13 and the motor input/output gear 16 to a first position which lies closer to the motor input/output gear 16, the operating element 17 is spaced away from the flywheel output/input gear 13 (the first clutch CL1: released), whereby the second motor/generator M/G2 and the flywheel FW are disengaged, and the operating element 17 meshes with the motor input/output gear 16 (the second clutch CL2: applied), so that the second motor/generator M/G2 and the drive shaft DS2 are engaged. In addition, when the operating element 17 moves from the middle position between the flywheel output/input gear 13 and the motor input/output gear 16 to a second position which lies closer to the flywheel output/input gear 13, the operating element 17 meshes with the flywheel output/input gear 13 (the first clutch CL1: applied), whereby the second motor/generator M/G2 and the flywheel FW are engaged, and the operating element 17 is spaced away from the motor input/output gear 16 (the second clutch CL2: released), so that the second motor/generator M/G2 and the drive shaft DS2 are disengaged.

Namely, with the operating element 17 situated in the first position, a first state results in which the first clutch CL1 is released, while the second clutch CL2 is applied, whereas with the operating element 17 situated in the second position, a second state results in which the first clutch CL1 is applied, while the second clutch CL2 is released. Thus, the clutches are switched between the first state and the second state according to the position of the operating element 17. In this way, since there is no such situation that the first clutch CL1 and the second clutch CL2 are applied at the same time, the two clutches can be controlled by a single actuator or the like, and by providing the single operating element 17, it is possible to reduce the number of constituent components.

Figure 9:
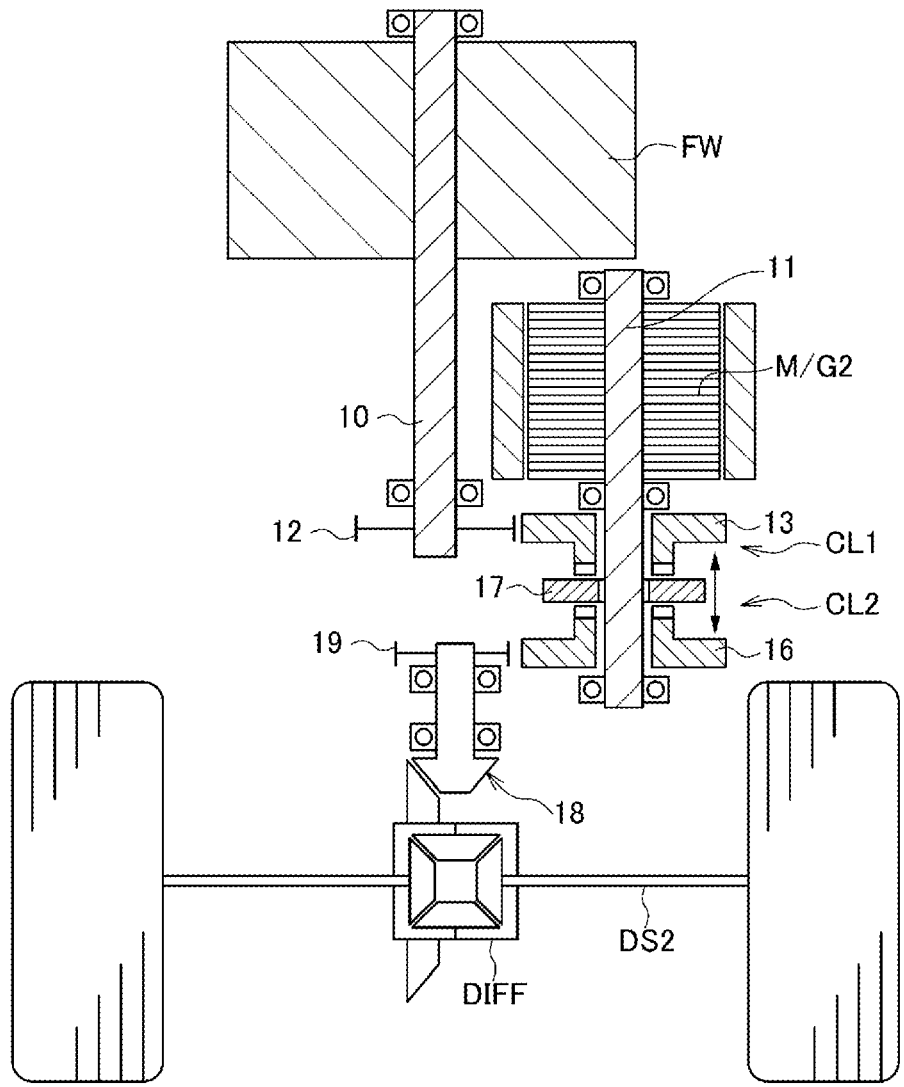
FIG. 9 is a drawing showing a second example of the vehicle driving system 1A of the second embodiment which shows specific configurations of first and second clutches CL1, CL2 and a specific arrangement of a second motor/generator M/G2 and a flywheel FW.

FIG. 9 is a drawing showing a second example of the vehicle driving system 1A of the second embodiment which shows specific configurations of a first and second clutches CL1, CL2 and a specific arrangement of a second motor/generator M/G2 and a flywheel FW.

In the second example, an axis of a cylindrical flywheel FW extends in a longitudinal direction of a vehicle, and an axis of a second motor/generator M/G2 extends in the longitudinal direction of the vehicle. A flywheel output/input gear 13 which meshes with an input/output gear 12 of a flywheel shaft 10 and a motor input/output gear 16 which meshes with a gear 19 which is provided at an opposite side to a side where a bevel gear 18 is provided which meshes with a differential gear DIFF are disposed around a motor shaft 11 of the motor/generator M/G2 so as not only to rotate relative to the motor shaft 11 but also to face each other in the longitudinal direction of the vehicle. An operating element 17 which is mounted on the motor shaft 11 so as to rotate together therewith is disposed so as to be moved in the longitudinal direction of the vehicle by an actuator, not shown. The first clutch CL1 is made up of this operating element 17 and the flywheel output/input gear 13, and the second clutch CL2 is made up of the operating element 17 and the motor input/output gear 16. The operation of the second example is similar to that of the first example, and therefore, the description thereof will be omitted here.

Figure 10:
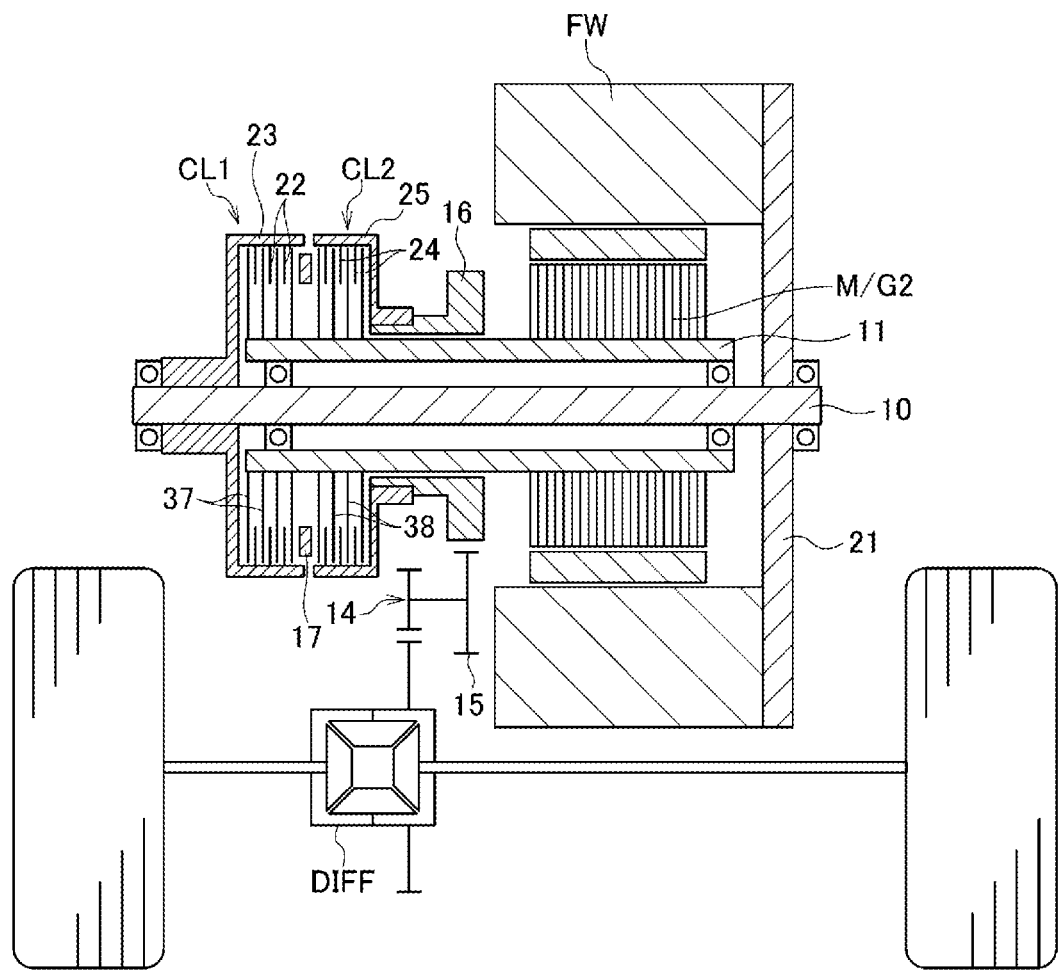
FIG. 10 is a drawing showing a third example of the vehicle driving system 1A of the second embodiment which shows specific configurations of first and second clutches CL1, CL2 and a specific arrangement of a second motor/generator M/G2 and a flywheel FW.

FIG. 10 is a drawing showing a third example of the vehicle driving system 1A of the second embodiment which shows specific configurations of a first and second clutches CL1, CL2 and a specific arrangement of a second motor/generator M/G2 and a flywheel FW.

In the third example, an axis of a cylindrical flywheel FW and an axis of a second motor/generator M/G2 are coaxial and extend in the widthwise direction of the vehicle, and the motor/generator M/G2 is accommodated in an inner circumferential portion of the flywheel FW. A motor shaft 11 of the motor/generator M/G2 has a hollow construction, and a flywheel shaft 10 on which an arm portion 21 which supports the flywheel FW is mounted is inserted through an inner circumferential portion of the motor shaft 11. A first support member 23 which holds plural first friction plates 22 on an inner circumferential surface is mounted on an end portion of the flywheel shaft 10 which lies opposite to an end portion where the arm portion 21 is provided.

A motor input/output gear 16 which meshes with a large-diameter gear 15 of a two-stage pinion 14 which meshes with a differential gear DIFF is disposed around the motor shaft 11 so as to rotate relative thereto, and a second support member 25 which holds plural second friction plates 24 on an inner circumferential surface is mounted on the motor input/output gear 16. Plural first friction disks 37 are disposed on an outer circumferential surface of the motor shaft 11 at the side of the first support member 23, and plural second friction disks 38 are disposed at the side of the second support member 25. The pluralities of first friction plates 22 and first friction disks 37 are disposed alternately in an axial direction, and the pluralities of second friction plates 24 and second friction disks 38 are disposed alternately in the axial direction. An operating element 17 which is mounted on the motor shaft 11 so as to rotate together therewith is disposed between the plural first friction plates 22 and the plural second friction plates 24 so as to be moved in the widthwise direction of the vehicle by an actuator, not shown. The first clutch CL1 is made up of this operating element 17, the plural first friction plates 22 and the plural first friction disks 37, whereas the second clutch CL2 is made up of the operating element 17, the plural second friction plates 24 and the plural second friction disks 38.

When the operating element 17 is situated in a middle position between the plural first friction plates 22 and the plural second friction plates 24, the plural first friction disks 37 are spaced away from the plural first friction plates 22, and the plural second friction disks 38 are space away from the plural second friction plates 24 (the first clutch CL1: released, the second clutch CL2: released), whereby the second motor/generator M/G2 and the flywheel FW are disengaged, and the second motor/generator M/G2 and a drive shaft DS2 are disengaged.

When the operating element 17 moves from the middle position between the plural first friction plates 22 and the plural second friction plates 24 to a first position which lies closer to the second friction plates 24, the plural first friction disks 37 are spaced away from the plural first friction plates 22 (the first clutch CL1: released), whereby the second motor/generator M/G2 and the drive shaft DS2 are disengaged, while the plural second friction disks 38 are frictionally engaged with the plural second friction plates 24 (the second clutch CL2: applied), whereby the second motor/generator M/G2 and the drive shaft DS2 are engaged. In addition, when the operating element 17 moves from the middle position between the plural first friction plates 22 and the plural second friction plates 24 to a second position which lies closer to the first friction plates 22, the plural first friction disks 37 are frictionally engaged with the plural first friction plates 22 (the first clutch CL1: applied), whereby the second motor/generator M/G2 and the flywheel FW are engaged, while the plural second friction disks 38 are spaced away from the plural second friction plates 24 (the second clutch CL2: released), whereby the second motor/generator M/G2 and the drive shaft DS2 are disengaged. Consequently, in this example, too, with the operating element 17 situated in the first position, a first states results in which the first clutch CL1 is released, while the second clutch CL2 is applied, whereas with the operating element 17 situated in the second position, a second state results in which the first clutch CL1 is applied, while the second clutch CL2 is released. Thus, the clutches are switched between the first state and the second state according to the positions of the operating element 17, and a similar advantage to those of the first and second examples can be obtained.

Figure 11:
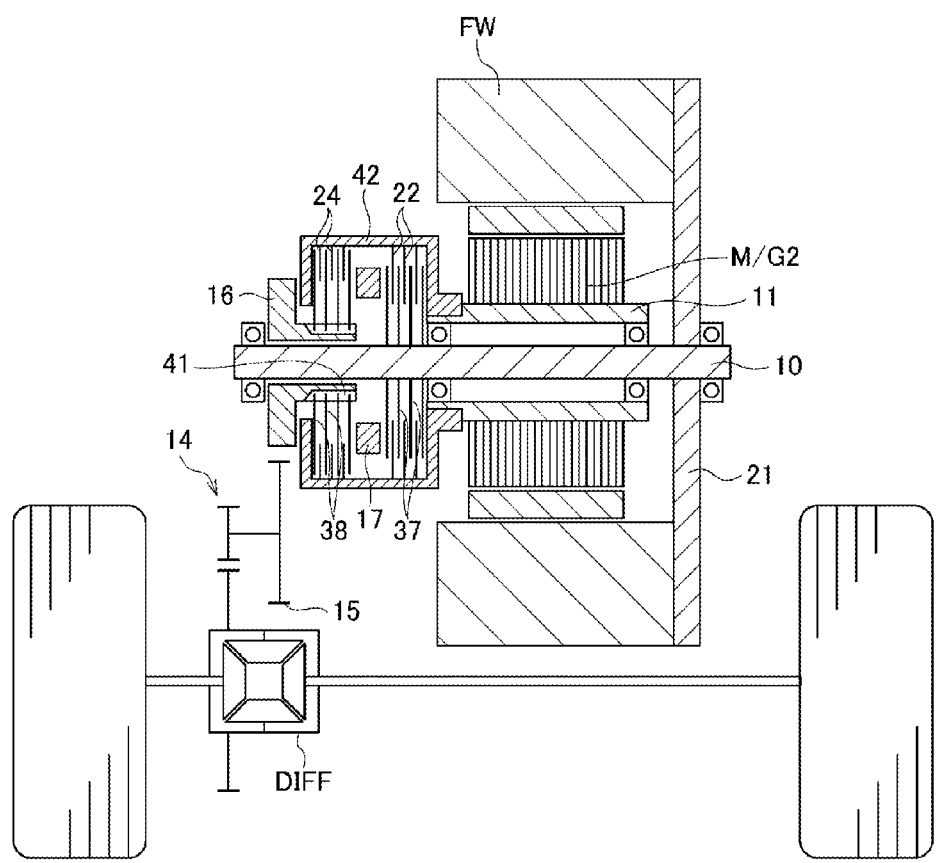
FIG. 11 is a drawing showing a fourth example of the vehicle driving system 1A of the second embodiment which shows specific configurations of first and second clutches CL1, CL2 and a specific arrangement of a second motor/generator M/G2 and a flywheel FW.

FIG. 11 is a drawing showing a fourth example of the vehicle driving system 1A of the second embodiment which shows specific configurations of a first and second clutches CL1, CL2 and a specific arrangement of a second motor/generator M/G2 and a flywheel FW.

In the fourth example, an axis of a cylindrical flywheel FW and an axis of a second motor/generator M/G2 are coaxial and extend in the widthwise direction of the vehicle, and the motor/generator M/G2 is accommodated in an inner circumferential portion of the flywheel FW. A motor shaft 11 of the motor/generator M/G2 has a hollow construction, and a flywheel shaft 10 on which an arm portion 21 which supports the flywheel FW is mounted is inserted through an inner circumferential portion of the motor shaft 11. A motor input/output gear 16 which meshes with a large-diameter gear 15 of a two-stage pinion 14 which meshes with a differential gear DIFF is disposed at an end portion (a left end portion in the figure) of the flywheel shaft 10 which lies opposite to an end portion where the arm portion 21 is provided so as to rotate relative to the flywheel shaft 10. A third support member 41 which holds plural second friction disks 38 on an outer circumferential surface is mounted on the motor input/output gear 16.

A fourth support member 42 which holds plural second friction plates 24 at a side lying closer to the third support member 41 on an inner circumferential surface thereof and plural first friction plates 22 at a side lying closer to the second motor/generator M/G2 on the inner circumferential surface thereof is mounted on the motor shaft 11. Plural first friction disks 37 are disposed on an outer circumferential surface of the flywheel shaft 10, and the pluralities of first friction plates 22 and first friction disks 37 are disposed alternately in an axial direction, and the pluralities of second friction plates 24 and second friction disks 38 are disposed alternately in the axial direction. An operating element 17 which is mounted so as to rotate together with the fourth support member 42 is disposed between the plural first friction plates 22 and the plural second friction plates 24 so as to be moved in the widthwise direction of the vehicle by an actuator, not shown. The first clutch CL1 is made up of this operating element 17, the plural first friction plates 22 and the plural first friction disks 37, whereas the second clutch CL2 is made up of the operating element 17, the plural second friction plates 24 and the plural second friction disks 38. The operation of the fourth example is similar to that of the third embodiment, and therefore, the description thereof will be omitted here. In this example, too, the clutches are shifted between a first state and a second state, and a similar advantage to those of the first and second examples can be obtained.

Thus, as has been described heretofore, according to this embodiment, in addition to the advantage of the first embodiment, there is provided the operating element 17 which is shifted to a first position where the first state results in which the first clutch CL1 is released, while the second clutch CL2 is applied and to a second position where the second state results in which the first clutch CL1 is applied, while the second clutch CL2 is released, whereby the two clutches can be controlled by the single operating element, thereby making it possible to reduce the number of constituent components.

Third Embodiment

Next, a third embodiment of a vehicle driving system according to the invention will be described based on the drawings.

Figure 12:
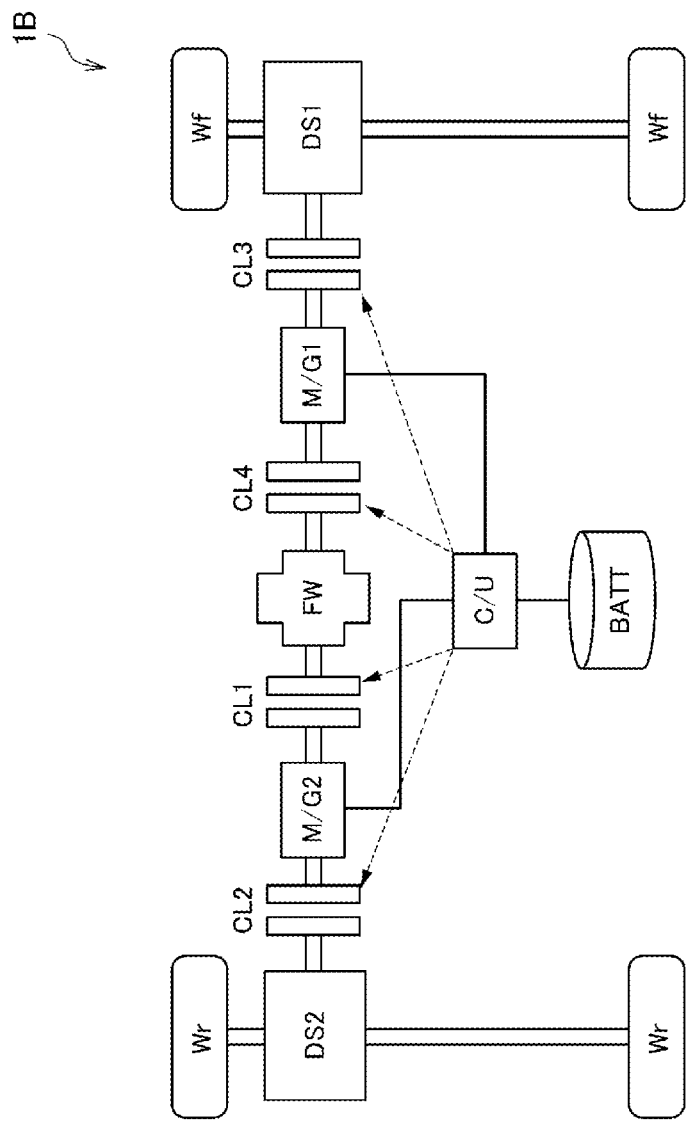
FIG. 12 is a block diagram showing a schematic configuration of a vehicle driving system of a third embodiment according to the invention.

FIG. 12 is a block diagram showing a schematic configuration of a vehicle driving system of a third embodiment according to the invention.

In a vehicle driving system 1B of this embodiment, a first motor/generator M/G1 is mechanically connected to a drive shaft DS1 which is coupled to either of front wheels Wf and rear wheels Wr, and a second motor/generator M/G2 is mechanically connected to a drive shaft DS2 which is coupled to the other wheels. The first motor/generator M/G1 and the second motor/generator M/G2 are also mechanically connected to a flywheel FW, and rotational shafts of the first motor/generator M/G1, the second motor/generator M/G2 and the flywheel FW are disposed coaxially in a longitudinal direction of a vehicle.

A first clutch CL1 is provided on a power transmission path between the second motor/generator M/G2 and the flywheel FW, a second clutch CL2 is provided on a power transmission path between the second motor/generator M/G2 and the drive shaft DS2. A third clutch CL3 is provided on a power transmission path between the first motor/generator M/G1 and the drive shaft DS1 and a fourth clutch CL4 is provided on a power transmission path between the first motor/generator M/G1 and the flywheel FW. In this embodiment, the third clutch CL3 does not necessarily have to be provided, and the first motor/generator M/G1 and the drive shaft DS1 may be coupled directly to each other.

Consequently, the second motor/generator M/G2 and the flywheel FW are engaged or disengaged by applying or releasing the first clutch CL1. The second motor/generator M/G2 and the drive shaft DS2 are engaged or disengaged by applying or releasing the second clutch CL2. The first motor/generator M/G1 and the drive shaft DS1 are engaged or disengaged by applying or releasing the third clutch CL3. The first motor/generator M/G1 and the flywheel FW are engaged or disengaged by engaging or disengaging the fourth clutch CL4.

In the vehicle driving system 1B in which its constituent components are mechanically connected in the way described above, electric energy which is transmitted to the second motor/generator M/G2 can be stored in the flywheel FW as kinetic energy by applying the first clutch CL1, and the kinetic energy stored in the flywheel FW can be converted into electric energy in the second motor/generator M/G2.

Since the second motor/generator M/G2 is connected to the drive shaft DS2 by way of the second clutch CL2, a driving force can be transmitted to the rear wheels Wr which are coupled to the drive shaft DS2 by applying the second clutch CL2 and driving the second motor/generator M/G2 for power running. A braking force can be exerted on the rear wheels Wr which are coupled to the drive shaft DS2 by driving the second motor/generator M/G2 for regeneration.

Since the first motor/generator M/G1 is connected to the drive shaft DS1 by way of the third clutch CL3, a driving force can be transmitted to the front wheels Wf which are coupled to the drive shaft DS1 by applying the third clutch CL3 and driving the first motor/generator M/G1 for power running. A braking force can be exerted on the front wheels Wf which are coupled to the drive shaft DS1 by driving the first motor/generator M/G1 for regeneration.

The electric energy transmitted to the first motor/generator M/G1 can be stored in the flywheel FW as kinetic energy, and the kinetic energy stored in the flywheel FW can be converted into electric energy in the first motor/generator M/G1.

Further, the second embodiment is similar to the first embodiment in that the first motor/generator M/G1 and the second motor/generator M/G2 are electrically connected to each other via a controller C/U and further that a battery BATT is installed in the vehicle driving system 1B and is controlled by the controller C/U. In this embodiment, too, there is no such situation that the controller C/U applies both the first clutch CL1 and the second clutch CL2 at the same time. This obviates the necessity of providing a transmission for matching rotation speeds of the clutches on the power transmission path between the second motor/generator M/G2 and the flywheel FW. Further, when the second motor/generator M/G2 is driven for power running or driven for regeneration with the second clutch CL2 left applied, the first clutch CL1 is released, and therefore, the dragging of the flywheel FW is prevented, whereas when the second motor/generator M/G2 is driven for power running or driven for regeneration with the first clutch CL1 left applied, the second clutch CL2 is released, and therefore, the dragging of the drive shaft DS2 is prevented. By adopting this configuration, it is possible to transmit and store the energy efficiently. There is no such situation that the controller C/U applies both the third clutch CL3 and the fourth clutch CL4 at the same time. This obviates the necessity of providing a transmission for matching rotation speeds of the clutches on the power transmission path between the first motor/generator M/G1 and the flywheel FW. Further, when the first motor/generator M/G1 is driven for power running or driven for regeneration with the third clutch CL3 left applied, the fourth clutch CL4 is released, and therefore, the dragging of the flywheel FW is prevented. On the contrary, when the first motor/generator M/G1 is driven for power running or driven for regeneration with the fourth clutch CL4 left applied, the third clutch CL3 is released, and therefore, the dragging of the drive shaft DS1 is prevented. By adopting this configuration, it is possible to transmit and store the energy efficiently.

Following this, the control of the vehicle driving system 1B while the vehicle is running will be described.

FIG. 13 shows block diagrams illustrating states of the clutches and flows of torque when the vehicle runs normally, in which (a) depicts states of the clutches and a flow of torque when the vehicle runs in front-wheel drive (2WD), (b) depicts states of the clutches and a flow of torque when the vehicle runs in rear-wheel drive (2WD), and (c) depicts states of the clutches and flows of torque when the vehicle runs in four-wheel drive (4WD).

When the vehicle runs in front-wheel drive (2WD), as shown in FIG. 13(a), the power-running torque from the first motor/generator M/G1 is transmitted to the drive shaft DS1 by driving the first motor/generator M/G1 for power running with electric energy from the battery BATT such that the first clutch CL1, the second clutch CL2 and the fourth clutch CL4 are released, while the third clutch CL3 is applied.

When the vehicle runs in rear-wheel drive (2WD), as shown in FIG. 13(b), the power-running torque from the second motor/generator M/G2 is transmitted to the drive shaft DS2 by driving the second motor/generator M/G2 for power running with the electric energy from the battery BATT such that the first clutch CL1, the third clutch CL3 and the fourth clutch CL4 are released, while the second clutch CL2 is applied.

When the vehicle runs in four-wheel drive (4WD), as shown in FIG. 13(c), the power-running torque from the first motor/generator M/G1 is transmitted to the drive shaft DS1 and the power-running torque from the second motor/generator M/G2 is transmitted to the drive shaft DS2 by driving the first motor/generator M/G1 and the second motor/generator M/G2 for power running with the electric energy from the battery BATT such that the first clutch CL1 and the fourth clutch CL4 are released, while the second clutch CL2 and the third clutch CL3 are applied.

In this way, while the vehicle is running normally, the energy can be transmitted efficiently while reducing the drag loss of the flywheel FW with respect to the first motor/generator M/G1 and/or the second motor/generator M/G2 which is driven for power running by keeping released the first clutch CL1 which is provided on the power transmission path between the second motor/generator M/G2 and the flywheel FW and the fourth clutch CL4 which is provided on the power transmission path between the first motor/generator M/G1 and the flywheel FW.

FIG. 14 shows block diagrams illustrating states of the clutches and flows of torque when a regenerative braking is executed in the third embodiment, in which (a) depicts states of the clutches and flows of torque when energy is stored in FW {(regeneration amount≤FW storage capacity)+(DS1 estimated regeneration amount>DS2 estimated regeneration amount)}, (b) depicts states of the clutches and flows of torque when energy is stored in FW {(regeneration amount≤FW storage capacity)+(DS1 estimated regeneration amount<DS2 estimated regeneration amount)}, and (c) depicts states of the clutches and flows of torque when BATT is charged (regeneration amount>FW storage capacity).

When a regenerative braking is executed, in case a regeneration amount is equal to or less than a storage capacity of the flywheel FW, regenerated energy is stored in the flywheel FW as kinetic energy, whereas in case the regeneration amount exceeds the storage capacity of the flywheel FW, the regenerated energy is stored in the battery BATT as electric energy. In case the regeneration amount is equal to or less than the storage capacity of the flywheel FW, an estimated regeneration amount in the drive shaft DS1 is compared with an estimated regeneration amount in the drive shaft DS2, and regeneration is executed by the motor/generator which is connected to the drive shaft with the larger estimated regeneration amount. By doing this, also when the energy of the vehicle is recovered by either of the first motor/generator M/G1 and the second motor/generator M/G2, not only can the energy be stored in the flywheel FW as required, but also the regeneration can be executed by one of the first motor/generator M/G1 and the second motor/generator M/G2 which regenerates more, whereby it is possible to recover more the kinetic energy of the vehicle.

In case the regeneration amount is equal to or less than the storage capacity of the flywheel FW and the estimated regeneration amount in the drive shaft DS1 is larger than the estimated regeneration amount in the drive shaft DS2, as shown in FIG. 14(a), the kinetic energy of the drive shaft DS1 is converted into electric energy as regenerative energy of the first motor/generator M/G1 by driving the first motor/generator M/G1 for regeneration and driving the second motor/generator M/G2 for power running such that the second clutch CL2 and the fourth clutch CL4 are released, while the first clutch CL1 and the third clutch CL3 are applied. Then, the second motor/generator M/G2 is driven for power running with the electric energy so converted, and kinetic energy of the second motor/generator M/G2 is stored in the flywheel FW (a first vehicle energy recovery control). Consequently, the kinetic energy of the vehicle can be stored in the flywheel FW by way of the front wheels Wf, the third clutch CL3, the first motor/generator M/G1, the second motor/generator M/G2, and the first clutch CL1 mechanically or electrically. By keeping released the second clutch CL2 which is provided on the power transmission path between the second motor/generator M/G2 and the drive shaft DS2 in the way described above, a risk is eliminated that the second motor/generator M/G2 which is driven for power running by receiving regenerative electric power of the first motor/generator M/G1 is disturbed by the dragging of the drive shaft DS2. Thus, the energy can be stored in the flywheel FW more efficiently. By keeping released the fourth clutch CL4 which is provided on the power transmission path between the first motor/generator M/G1 and the flywheel FW, a risk is eliminated that the first motor/generator M/G1 which is driven for power running is disturbed by the dragging of the flywheel FW.

In case the regeneration amount is equal to or less than the storage capacity of the flywheel FW and the estimated regeneration amount in the drive shaft DS2 is larger than the estimated regeneration amount in the drive shaft DS1, as shown in FIG. 14(b), the kinetic energy of the drive shaft DS2 is converted into electric energy as regenerative energy of the second motor/generator M/G2 by driving the second motor/generator M/G2 for regeneration and driving the first motor/generator M/G1 for power running such that the first clutch CL1 and the third clutch CL3 are released, while the second clutch CL2 and the fourth clutch CL4 are applied. Then, the first motor/generator M/G1 is driven for power running with the electric energy so converted, and kinetic energy of the first motor/generator M/G1 is stored in the flywheel FW (a second vehicle energy recovery control). Consequently, the kinetic energy of the vehicle can be stored in the flywheel FW by way of the rear wheels Wr, the second clutch CL2, the second motor/generator M/G2, the first motor/generator M/G1, and the fourth clutch CL4 mechanically or electrically. By keeping released the third clutch CL3 which is provided on the power transmission path between the first motor/generator M/G1 and the drive shaft DS1 in the way described above, a risk is eliminated that the first motor/generator M/G1 which is driven for power running by receiving regenerative electric power of the second motor/generator M/G2 is disturbed by the dragging of the drive shaft DS1. Thus, the energy can be stored in the flywheel FW more efficiently. By keeping released the first clutch CL1 which is provided on the power transmission path between the second motor/generator M/G2 and the flywheel FW, a risk is eliminated that the second motor/generator M/G2 which is driven for power running is disturbed by the dragging of the flywheel FW.

In case the regeneration amount exceeds the storage capacity of the flywheel FW, as shown in FIG. 14(c), the regenerative energy from the first motor/generator M/G1 and the second motor/generator M/G2 is converted into electric energy to be stored in the battery BATT by driving the first motor/generator M/G1 for regeneration and driving the second motor/generator M/G2 for regeneration such that the first clutch CL1 and the fourth clutch CL4 are released, while the second clutch CL2 and the third clutch CL3 are applied (a third vehicle energy recovery control). In this way, when the energy stored in the flywheel FW is of the predetermined level or higher, the regenerative energy is stored in the battery BATT, whereby the vehicle can be slowed stably, thereby making it possible to suppress the failure in recovering the energy of the vehicle. The drag loss of the flywheel FW with respect to first motor/generator M/G1 and the second motor/generator M/G2 which are driven for regeneration can be reduced by detaching the flywheel FW, whereby it is possible to recover the energy efficiently.

FIG. 15 shows block diagrams depicting states of the clutches and flows of torque when energy in the flywheel FW is discharged, in which (a) depicts states of the clutches and flows of torque when DS1 estimated slip amount<DS2 estimated slip amount, and (b) depicts states of the clutches and flows of torque when DS1 estimated slip amount>DS2 estimated slip amount.

In discharging the energy in the flywheel FW, when an estimated slip amount of the drive shaft DS1 is smaller than an estimated slip amount of the drive shaft DS2, that is, when the drive shaft DS2 is easier to slip than the drive shaft DS1, the vehicle is driven by the first motor/generator M/G1 which is connected to the drive shaft DS1, whereas when the estimated slip amount of the drive shaft DS1 is larger than the estimated slip amount of the drive shaft DS2, that is, when the drive shaft DS1 is easier to slip than the drive shaft DS2, the vehicle is driven by the second motor/generator M/G2 which is connected to the drive shaft DS2. By adopting this configuration, also when the vehicle is driven by either of the first motor/generator M/G1 and the second motor/generator M/G2, in addition to the fact that the energy of the flywheel FW can be supplied as required, by driving the vehicle by the motor/generator which is connected to the drive shaft which is more difficult to slip, the running stability and roadability of the vehicle are enhanced.

When the estimated slip amount of the drive shaft DS1 is smaller than the estimated slip amount of the drive shaft DS2, that is, when the drive shaft DS2 is easier to slip than the drive shaft DS1, the kinetic energy of the flywheel FW is, as shown in FIG. 15(a), converted into electric energy as regenerative energy of the second motor/generator M/G2 by driving the second motor/generator M/G2 for regeneration and driving the first motor/generator M/G1 for power running such that the second clutch CL2 and the fourth clutch CL4 are released, while the first clutch CL1 and the third clutch CL3 are applied. Then, the first motor/generator M/G1 is driven for power running with the electric energy so converted, and the kinetic energy of the first motor/generator M/G1 is transmitted to the drive shaft DS1 (a first vehicle drive control). This enables the energy stored in the flywheel FW to be transmitted to the front wheels Wf by way of the first clutch CL1, the second motor/generator M/G2, the first motor/generator M/G1 and the third clutch CL3 mechanically or electrically. By leaving released the second clutch CL2 which is provided on the power transmission path between the second motor/generator M/G2 and the drive shaft DS2 in the way described above, a risk is eliminated that the second motor/generator M/G2 which is driven for regeneration is disturbed by the dragging of the drive shaft DS2. By leaving released the fourth clutch CL4 which is provided on the power transmission path between the first motor/generator M/G1 and the flywheel FW, a risk is eliminated that the first motor/generator M/G1 which is driven for power running by receiving the regenerative electric power of the second motor/generator M/G2 is disturbed by the dragging of the flywheel FW. Thus, the vehicle can be driven more efficiently.

When the estimated slip amount of the drive shaft DS1 is larger than the estimated slip amount of the drive shaft DS2, that is, when the drive shaft DS1 is easier to slip than the drive shaft DS2, as shown in FIG. 15(b), the kinetic energy of the flywheel FW is converted into electric energy as regenerative energy of the first motor/generator M/G1 by driving the first motor/generator M/G1 for regeneration and driving the second motor/generator M/G2 for power running such that the first clutch CL1 and the third clutch CL3 are released, while the second clutch CL2 and the fourth clutch CL4 are applied. Then, the second motor/generator M/G2 is driven for power running with the electric energy so converted, and the kinetic energy of the second motor/generator M/G2 is transmitted to the drive shaft DS2 (a second vehicle drive control). This enables the energy stored in the flywheel FW to be transmitted to the rear wheels Wf by way of the fourth clutch CL4, the first motor/generator M/G1, the second motor/generator M/G2 and the second clutch CL2 mechanically or electrically. By leaving released the third clutch CL3 which is provided on the power transmission path between the first motor/generator M/G1 and the drive shaft DS1 in the way described above, a risk is eliminated that the first motor/generator M/G1 which is driven for regeneration is disturbed by the dragging of the drive shaft DS1. By leaving released the first clutch CL1 which is provided on the power transmission path between the second motor/generator M/G2 and the flywheel FW, a risk is eliminated that the second motor/generator M/G2 which is driven for power running by receiving the regenerative electric power of the first motor/generator M/G1 is disturbed by the dragging of the flywheel FW. Thus, the vehicle can be driven more efficiently.

Thus, as has been described heretofore, according to this embodiment, in addition to the advantage of the first embodiment, since the first motor/generator M/G1 and the second motor/generator M/G2 are mechanically connected to the single flywheel FW, it is possible to reverse the roles of the motor/generator which contributes to the recovery of the energy of the vehicle by being driven for regeneration and the motor/generator which contributes to the storage of the kinetic energy by being driven for power running according to the conditions of the vehicle and the road surface or the like. Consequently, not only can regenerative braking be executed by the motor/generator which is connected to the drive shaft which regenerates more, but also power running can be executed by the motor/generator which is connected to the drive shaft which slips less.

There are provided the first clutch CL1 which is provided on the power transmission path between the second motor/generator M/G2 and the flywheel FW and which engages or disengages a side of the second motor/generator M/G2 and a side of the flywheel FW by being applied or released, the second clutch CL2 which is provided on the power transmission path between the second motor/generator M/G2 and the rear wheels Wr and which engages or disengages a side of the second motor/generator M/G2 and a side of the rear wheels Wr by being applied or released, the third clutch CL3 which is provided on the power transmission path between the front wheels Wf and the first motor/generator M/G1 and which engages or disengages a side of the front wheels Wf and a side of the first motor/generator M/G1 by being applied or released, and the fourth clutch CL4 which is provided on the power transmission path between the first motor/generator M/G1 and the flywheel FW and which engages or disengages a side of the first motor/generator M/G1 and a side of the flywheel FW by being applied or released. Therefore, the first motor/generator M/G and the second motor/generator M/G2 can be engaged with or disengaged from the front wheels Wf or the rear wheels Wr according to situations, whereby it is possible to execute the recovery of the energy of the vehicle or the storage of the kinetic energy into the flywheel FW by the first motor/generator M/G1 and the second motor/generator M/G2 as required.

Since the rotational shafts of the first motor/generator M/G1, the second motor/generator M/G2 and the flywheel FW are disposed coaxially in the longitudinal direction of the vehicle, it is possible to reduce the size of the vehicle driving system in a radial direction.

Fourth Embodiment

Next, a fourth embodiment of a vehicle driving system according to the invention will be described based on the drawings.

FIG. 16 is a block diagram showing a schematic configuration of a vehicle driving system of a fourth embodiment according to the invention.

A vehicle driving system 1C of this embodiment differs from the vehicle driving system 1 of the first embodiment in that two flywheels are provided and with the flywheel FW in the vehicle driving system 1 of the first embodiment referred to as a first flywheel FW1, a first motor/generator M/G1 is mechanically connected to an additional second flywheel FW2. In this embodiment, in addition to the fact that rotational shafts of a second motor/generator M/G2 and the first flywheel FW1 are disposed coaxially, rotational shafts of the first motor/generator M/G1 and the second flywheel FW2 are arranged coaxially, and both the rotation shafts are disposed parallel in a widthwise direction of the vehicle. Hereinafter, the different features from the vehicle driving system 1 of the first embodiment will be described in detail, and like reference numerals will be given to like portions to those of the first embodiment, and the description thereof will be omitted here.

A fourth clutch CL4 is provided on a power transmission path between the first motor/generator M/G1 and the second flywheel FW2, and the first motor/generator M/G1 and the second flywheel FW2 are engaged or disengaged by applying or releasing the fourth clutch CL4. Consequently, not only can electric energy which is transmitted to the first motor/generator M/G1 can be stored in the second flywheel FW2 by applying the fourth clutch CL4, but also kinetic energy stored in the second flywheel FW2 can be converted into electric energy in the first motor/generator M/G1.

There occurs no such situation that a controller C/U applies both a first clutch CL1 and a second clutch CL2 at the same time and applies both a third clutch CL3 and the fourth clutch CL4 at the same time. This also obviates the necessity of providing a transmission for matching rotation speeds of the clutches on a power transmission path between the first motor/generator M/G1 and the second flywheel FW2. Further, when the first motor/generator M/G1 is driven for power running or for regeneration with the third clutch CL3 left applied, since the fourth clutch CL4 is released, the dragging of the second flywheel FW2 does not occur. On the contrary, when the first motor/generator M/G1 is driven for power running or for regeneration with the fourth clutch CL4 left applied, since the third clutch CL3 is released, the dragging of the drive shaft DS1 does not occur. By adopting this configuration, the transmission and storage of energy can be executed efficiently.

Following this, the control of the vehicle driving system 1C while the vehicle is running will be described.

FIG. 17 shows block diagrams illustrating states of clutches and flows of torque when a vehicle runs normally in the fourth embodiment, in which (a) depicts states of the clutches and flows of torque when the vehicle runs in front-wheel drive (2WD), (b) depicts states of the clutches and a flow of torque when the vehicle runs in rear-wheel drive (2WD), and (c) depicts states of the clutches and flows of torque when the vehicle runs in four-wheel drive (4WD).

When the vehicle runs in front-wheel drive (2WD), as shown in FIG. 17(*a*), the power-running torque from the first motor/generator M/G1 is transmitted to the drive shaft DS1 by driving the first motor/generator M/G1 for power running with electric energy from the battery BATT such that the first clutch CL1, the second clutch CL2 and the fourth clutch CL4 are released, while the third clutch CL3 is applied.

When the vehicle runs in rear-wheel drive (2WD), as shown in FIG. 17(*b*), the power-running torque of the second motor/generator M/G2 is transmitted to the drive shaft DS2 by driving the second motor/generator M/G2 for power running with the electric energy from the battery BATT such that the first clutch CL1 the third clutch CL3 and the fourth clutch CL4 are released, while the second clutch CL2 is applied.

When the vehicle runs in four-wheel drive (4WD), as shown in FIG. 13(*c*), the power-running torque of the first motor/generator M/G1 is transmitted to the drive shaft DS1 and the power-running torque of the second motor/generator M/G2 is transmitted to the drive shaft DS2 by driving the first motor/generator M/G1 and the second motor/generator M/G2 for power running with the electric energy from the battery BATT such that the first clutch CL1 and the fourth clutch CL4 are released, while the second clutch CL2 and the third clutch CL3 are applied.

In this way, while the vehicle is running normally, the energy can be transmitted efficiently while reducing the drag loss of the second flywheel FW2 and/or the first flywheel FW with respect to the first motor/generator M/G1 and/or the second motor/generator M/G2 which is driven for power running by keeping released the first clutch CL1 which is provided on the power transmission path between the second motor/generator M/G2 and the first flywheel FW1 and the fourth clutch CL4 which is provided on the power transmission path between the first motor/generator M/G1 and the second flywheel FW2.

FIG. 18 shows block diagrams illustrating states of the clutches and flows of torque when a regenerative braking is executed in the fourth embodiment, in which (a) depicts states of the clutches and flows of torque when energy is stored in FW {(regeneration amount≤FW storage capacity)+(DS1 estimated regeneration amount>DS2 estimated regeneration amount)}, (b) depicts states of the clutches and flows of torque when energy is stored in FW {(regeneration amount≤FW storage capacity)+(DS1 estimated regeneration amount<DS2 estimated regeneration amount)}, and (c) depicts states of the clutches and flows of torque when BATT is charged (regeneration amount>FW storage capacity).

When a regenerative braking is executed, in case a regeneration amount is equal to or less than a storage capacity of the flywheel FW, regenerated energy is stored in the first flywheel FW1 or the second flywheel FW2 as kinetic energy, whereas in case the regeneration amount exceeds the storage capacity of the first flywheel FW1 and the second flywheel FW2, the regenerated energy is stored in the battery BATT as electric energy. In case the regeneration amount is equal to or less than the storage capacity of the first flywheel FW1 and the second flywheel FW2, an estimated regeneration amount in the drive shaft DS1 is compared with an estimated regeneration amount in the drive shaft DS2, and regeneration is executed by the motor/generator which is connected to the drive shaft with the larger estimated regeneration amount. By doing this, also when the energy of the vehicle is recovered by either of the first motor/generator M/G1 and the second motor/generator M/G2, not only can the energy be stored in the first flywheel FW1 or the second flywheel FW2 as required, but also the regeneration can be executed by one of the first motor/generator M/G1 and the second motor/generator M/G2 which regenerates more, whereby it is possible to recover more the kinetic energy of the vehicle.

In case the regeneration amount is equal to or less than the storage capacity of the flywheel FW and the estimated regeneration amount in the drive shaft DS1 is larger than the estimated regeneration amount in the drive shaft DS2, as shown in FIG. 18(*a*), the kinetic energy of the drive shaft DS1 is converted into electric energy as regenerative energy of the first motor/generator M/G1 by driving the first motor/generator M/G1 for regeneration and driving the second motor/generator M/G2 for power running such that the second clutch CL2 and the fourth clutch CL4 are released, while the first clutch CL1 and the third clutch CL3 are applied. Then, the second motor/generator M/G2 is driven for power running with the electric energy so converted, and kinetic energy of the second motor/generator M/G2 is stored in the first flywheel FW (a first vehicle energy recovery control). Consequently, the kinetic energy of the vehicle can be stored in the first flywheel FW1 by way of the front wheels Wf, the third clutch CL3, the first motor/generator M/G1, the second motor/generator M/G2, and the first clutch CL1 mechanically or electrically. By keeping released the second clutch CL2 which is provided on the power transmission path between the second motor/generator M/G2 and the drive shaft DS2 in the way described above, a risk is eliminated that the second motor/generator M/G2 which is driven for power running by receiving regenerative electric power of the first motor/generator M/G1 is disturbed by the dragging of the drive shaft DS2. Thus, the energy can be stored in the first flywheel FW1 more efficiently. By keeping released the fourth clutch CL4 which is provided on the power transmission path between the first motor/generator M/G1 and the second flywheel FW2, a risk is eliminated that the first motor/generator M/G1 which is driven for power running is disturbed by the dragging of the second flywheel FW2.

In case the regeneration amount is equal to or less than the storage capacity of the flywheel FW and the estimated regeneration amount in the drive shaft DS2 is larger than the estimated regeneration amount in the drive shaft DS1, as shown in FIG. 18(b), the kinetic energy of the drive shaft DS2 is converted into electric energy as regenerative energy of the second motor/generator M/G2 by driving the second motor/generator M/G2 for regeneration and driving the first motor/generator M/G1 for power running such that the first clutch CL1 and the third clutch CL3 are released, while the second clutch CL2 and the fourth clutch CL4 are applied. Then, the first motor/generator M/G1 is driven for power running with the electric energy so converted, and kinetic energy of the first motor/generator M/G1 is stored in the second flywheel FW2 (a second vehicle energy recovery control). Consequently, the kinetic energy of the vehicle can be stored in the second flywheel FW2 by way of the rear wheels Wr, the second clutch CL2, the second motor/generator M/G2, the first motor/generator M/G1, and the fourth clutch CL4 mechanically or electrically. By keeping released the third clutch CL3 which is provided on the power transmission path between the first motor/generator M/G1 and the drive shaft DS1 in the way described above, a risk is eliminated that the first motor/generator M/G1 which is driven for power running by receiving regenerative electric power of the second motor/generator M/G2 is disturbed by the dragging of the drive shaft DS1. Thus, the energy can be stored in the second flywheel FW2 more efficiently. By keeping released the first clutch CL1 which is provided on the power transmission path between the second motor/generator M/G2 and the first flywheel FW1, a risk is eliminated that the second motor/generator M/G2 which is driven for regeneration is disturbed by the dragging of the first flywheel FW1.

In case the regeneration amount exceeds the storage capacity of the flywheel FW, as shown in FIG. 18(c), the regenerative energy from the first motor/generator M/G1 and the second motor/generator M/G2 is converted into electric energy to be stored in the battery BATT by driving the first motor/generator M/G1 for regeneration and the driving the second motor/generator M/G2 for regeneration such that the first clutch CL1 and the fourth clutch CL4 are released, while the second clutch CL and the third clutch CL3 are applied (a third vehicle energy recovery control). In this way, when the energy stored in the first flywheel FW1 and the second flywheel FW2 is of a predetermined level or higher, the regenerated energy is stored in the battery BATT whereby the vehicle can be slowed stably, thereby making it possible to suppress the failure in recovering the energy of the vehicle. The dragging of the second flywheel FW2 and the first flywheel FW1 with respect to the first motor/generator M/G1 and the second motor/generator M/G2 can be suppressed, thereby making it possible to recover the energy efficiently.

FIG. 19 shows block diagrams depicting states of the clutches and flows of torque when energy in the flywheel FW1 or the second flywheel FW2 is discharged, in which (a) depicts states of the clutches and flows of torque when DS1 estimated slip amount<DS2 estimated slip amount, and (b) depicts states of the clutches and flows of torque when DS1 estimated slip amount>DS2 estimated slip amount.

In discharging the energy in the first flywheel FW1 or the second flywheel FW2, when an estimated slip amount of the drive shaft DS1 is smaller than an estimated slip amount of the drive shaft DS2, that is, when the drive shaft DS2 is easier to slip than the drive shaft DS1, the vehicle is driven by the first motor/generator M/G1 which is connected to the drive shaft DS1, whereas when the estimated slip amount of the drive shaft DS1 is larger than the estimated slip amount of the drive shaft DS2, that is, when the drive shaft DS1 is easier to slip than the drive shaft DS2, the vehicle is driven by the second motor/generator M/G2 which is connected to the drive shaft DS2. By adopting this configuration, also when the vehicle is driven by either of the first motor/generator M/G1 and the second motor/generator M/G2, in addition to the fact that the energy of the first flywheel FW1 or the second flywheel FW2 can be supplied as required, by driving the vehicle by the motor/generator which is connected to the drive shaft which is more difficult to slip, the running stability and roadability of the vehicle are enhanced.

When the estimated slip amount of the drive shaft DS1 is smaller than the estimated slip amount of the drive shaft DS2, that is, when the drive shaft DS2 is easier to slip than the drive shaft DS1, the kinetic energy of the first flywheel FW1 is, as shown in FIG. 19(a), converted into electric energy as regenerative energy of the second motor/generator M/G2 by driving the second motor/generator M/G2 for regeneration and driving the first motor/generator M/G1 for power running such that the second clutch CL2 and the fourth clutch CL4 are released, while the first clutch CL1 and the third clutch CL3 are applied. Then, the first motor/generator M/G1 is driven for power running with the electric energy so converted, and the kinetic energy of the first motor/generator M/G1 is transmitted to the drive shaft DS1 (a first vehicle drive control). This enables the energy stored in the first flywheel FW1 to be transmitted to the front wheels Wf by way of the first clutch CL1, the second motor/generator M/G2, the first motor/generator M/G1 and the third clutch CL3 mechanically or electrically. By leaving released the second clutch CL2 which is provided on the power transmission path between the second motor/generator M/G2 and the drive shaft DS2 in the way described above, a risk is eliminated that the second motor/generator M/G2 which is driven for regeneration is disturbed by the dragging of the drive shaft DS2. By leaving released the fourth clutch CL4 which is provided on the power transmission path between the first motor/generator M/G1 and the second flywheel FW2, a risk is eliminated that the first motor/generator M/G1 which is driven for power running by receiving the regenerative electric power of the second motor/generator M/G2 is disturbed by the dragging of the second flywheel FW2. Thus, the vehicle can be driven more efficiently.

When the estimated slip amount of the drive shaft DS1 is larger than the estimated slip amount of the drive shaft DS2, that is, when the drive shaft DS1 is easier to slip than the drive shaft DS2, as shown in FIG. 19(b), the kinetic energy of the second flywheel FW2 is converted into electric energy as regenerative energy of the first motor/generator M/G1 by driving the first motor/generator M/G1 for regeneration and driving the second motor/generator M/G2 for power running such that the first clutch CL1 and the third clutch CL3 are released, while the second clutch CL2 and the fourth clutch CL4 are applied. Then, the second motor/generator M/G2 is driven for power running with the electric energy so converted, and the kinetic energy of the second motor/generator M/G2 is transmitted to the drive shaft DS2 (a second vehicle drive control). This enables the energy stored in the second flywheel FW2 to be transmitted to the rear wheels Wr by way of the fourth clutch CL4, the first motor/generator M/G1, the second motor/generator M/G2 and the second clutch CL2 mechanically or electrically. By leaving released the third clutch CL3 which is provided on the power transmission path between the first motor/generator M/G1 and the drive shaft DS1 in the way described above, a risk is eliminated that the first motor/generator M/G1 which is driven for regeneration is disturbed by the dragging of the drive shaft DS1. By leaving released the first clutch CL1 which is provided on the power transmission path between the second motor/generator M/G2 and the first flywheel FW1, a risk is eliminated that the second motor/generator M/G2 which is driven for power running by receiving the regenerative electric power of the first motor/generator M/G1 is disturbed by the dragging of the first flywheel FW1. Thus, the vehicle can be driven more efficiently.

Thus, as has been described heretofore, according to this embodiment, there is provided the second flywheel FW2, in addition to the first flywheel FW1, and the first motor/generator M/G1 is mechanically connected not only to the drive shaft DS1 but also to the second flywheel FW2. Therefore, in addition to the advantage of the first embodiment, it is possible to reverse the roles of the motor/generator which contributes to the recovery of the energy of the vehicle by being driven for regeneration and the motor/generator which contributes to the storage of the kinetic energy by being driven for power running according to the conditions of the vehicle and the road surface or the like. Consequently, not only can regenerative braking be executed by the motor/generator which is connected to the drive shaft which regenerates more, but also power running can be executed by the motor/generator which is connected to the drive shaft which slips less.

There are provided the first clutch CL1 which is provided on the power transmission path between the second motor/generator M/G2 and the first flywheel FW1 and which engages or disengages a side of the second motor/generator M/G2 and a side of the first flywheel FW1 by being applied or released, the second clutch CL2 which is provided on the power transmission path between the second motor/generator M/G2 and the rear wheels Wr and which engages or disengages a side of the second motor/generator M/G2 and a side of the rear wheels Wr by being applied or released, the third clutch CL3 which is provided on the power transmission path between the front wheels Wf and the first motor/generator M/G1 and which engages or disengages a side of the front wheels Wf and a side of the first motor/generator M/G1 by being applied or released, and the fourth clutch CL4 which is provided on the power transmission path between the first motor/generator M/G1 and the second flywheel FW2 and which engages or disengages a side of the first motor/generator M/G1 and a side of the second flywheel FW2 by being applied or released. Therefore, the first motor/generator M/G1 and the second motor/generator M/G2 can be engaged with or disengaged from the front wheels Wf or the rear wheels Wr or the first or second flywheels FW1, FW2 according to situations, whereby it is possible to execute the recovery of the energy of the vehicle or the storage of the kinetic energy into the flywheel FW by the first motor/generator M/G1 and the second motor/generator M/G2 as required.

Since a rotational shaft of the first flywheel FW1 and a rotational shaft of the second flywheel FW2 are disposed on different axes, the degree of freedom in arranging the flywheels is enhanced, and the mechanism can be simplified, thereby making it possible to reduce the weight of the vehicle driving system.

It is noted that the invention is not limited to the embodiments that have been described heretofore, and hence, the invention can be modified or improved as required.

For example, the vehicle driving system can also be applied to a parallel hybrid electric vehicle in which an internal combustion engine such as an engine is connected to a drive shaft DS1 or a drive shaft DS2, whereby the vehicle can be driven by a motor/generator and the internal combustion engine. Any prime mover, not limited to the internal combustion engine, can be used.

In the embodiments, while the first motor/generator M/G1 and the second motor/generator M/G2 are described as being connected to the wheels via the drive shaft DS1 and the drive shaft DS2, respectively, they may be connected directly to the wheels.

In the embodiments, while the battery BATT is described as the example of the electric energy storing device, the invention is not limited thereto, and hence, other storage devices including a capacitor may be used.

This patent application is based on Japanese Patent Application (No. 2011-209292) filed on Sep. 26, 2011, the contents of which are incorporated herein by reference.

DESCRIPTION OF REFERENCE NUMERALS AND CHARACTERS

Wf: front wheel; Wr: rear wheel; M/G1: first motor/generator; M/G2: second motor/generator; FW: flywheel (kinetic energy storing device); FW1: first flywheel (kinetic energy storing device); FW2: second flywheel (kinetic energy storing device); 1, 1A, 1B, 1C: vehicle driving system; CL1 first clutch (first engaging/disengaging unit); CL2: second clutch (second engaging/disengaging unit); CL3: third clutch (third engaging/disengaging unit); CL4: fourth clutch (fourth engaging/disengaging unit); BATT: battery (electric energy storing device); C/U: controller (engaging/disengaging controller)

The invention claimed is:
1. A vehicle driving system including:
a first motor/generator which is mechanically connected with a first wheel of a vehicle;
a second motor/generator which is electrically connected with the first motor/generator and which is mechanically connected with a second wheel of the vehicle;
a kinetic energy storing device which is mechanically connected with the second motor/generator and which stores kinetic energy;
a first engaging/disengaging unit which is provided on a power transmission path between the second motor/ generator and the kinetic energy storing device and which engages or disengages a side of the second motor/generator and a side of the kinetic energy storing device by being applied or released;

a second engaging/disengaging unit which is provided on a power transmission path between the second motor/generator and the second wheel and which engages or disengages a side of the second motor/generator and a side of the second wheel by being applied or released; and an electric energy storing device which is electrically connected with the first motor/generator, wherein, when the first motor/generator is driven for regeneration by receiving power from the first wheel, the first engaging/disengaging unit is applied, the second motor/generator is driven for power, and the second engaging/disengaging unit is released and the second motor/generator and the second wheel are disengaged, when the energy stored in the kinetic energy storing device is of a predetermined level or higher, the first engaging/disengaging unit is released, the second engaging/disengaging unit is applied, and the second motor/generator is driven for regeneration, such that the first engaging/disengaging unit and the second engaging/disengaging unit are controlled so as not to be applied at the same time.

2. The vehicle driving system of claim 1,
wherein, when the energy stored in the kinetic energy storing device is of a predetermined level or higher, the first engaging/disengaging unit is released, and the driving of the second motor/generator for power running is stopped or is suppressed.

3. The vehicle driving system of claim 1,
wherein the electric energy storing device is electrically connected with the first motor/generator and the second motor/generator,
wherein, when the first motor/generator is driven for regeneration by receiving power from the first wheel and the second motor/generator is driven for regeneration by receiving power from the second wheel, the first engaging/disengaging unit is released, while the second engaging/disengaging unit is applied.

4. The vehicle driving system of claim 1,
wherein, when the second motor/generator is driven for regeneration by receiving power from the kinetic energy storing device, the first engaging/disengaging unit is applied, and the first motor/generator is driven for power running.

5. The vehicle driving system of claim 1,
wherein, when the energy stored in the kinetic energy storing device is of a predetermined level or lower, the regenerative driving of the second motor/generator is stopped or is suppressed, and the first motor/generator is driven for power running by receiving electric energy of the electric energy storing device.

6. The vehicle driving system of claim 1,
wherein the electric energy storing device is electrically connected with the first motor/generator and the second motor/generator,
wherein, when the vehicle is driven by the first wheel which rotates by receiving power from the first motor/generator and the second wheel which rotates by receiving power from the second motor/generator, the first engaging/disengaging unit is released, while the second engaging/disengaging unit is applied.

7. The vehicle driving system of claim 1, further including:
an engaging/disengaging unit controller which controls the first engaging/disengaging unit and the second engaging/disengaging unit,
wherein the engaging/disengaging unit controller executes switching between a first state in which the first engaging/disengaging unit is released, while the second engaging/disengaging unit is applied and a second state in which the first engaging/disengaging unit is applied, while the second engaging/disengaging unit is released.

8. The vehicle driving system of claim 7,
wherein the engaging/disengaging unit controller includes an operating element movable to a first position corresponding to the first state and to a second position corresponding to the second state.

9. The vehicle driving system of claim 1, further including:
a third engaging/disengaging unit which is provided on a power transmission path between the first wheel and the first motor/generator and which engages or disengages a side of the first wheel and a side of the first motor/generator by being applied or released.

10. The vehicle driving system of claim 1,
wherein the first motor/generator is further mechanically connected with the kinetic energy storing device.

11. The vehicle driving system of claim 10, further including:
a third engaging/disengaging unit which is provided on a power transmission path between the first motor/generator and the first wheel and which engages or disengages a side of the first motor/generator and a side of the first wheel by being applied or released; and
a fourth engaging/disengaging unit which is provided on a power transmission path between the first motor/generator and the kinetic energy storing device and which engages or disengages a side of the first motor/generator and a side of the kinetic energy storing device by being applied or released.

12. The vehicle driving system of claim 11,
wherein, when a first vehicle energy recovery control is executed in which the energy of the vehicle is recovered by driving only the first motor/generator for regeneration, the third engaging/disengaging unit is applied and the first motor/generator is driven for regeneration, while the first engaging/disengaging unit is applied and the second motor/generator is driven for power running, and
wherein, when a second vehicle energy recovery control is executed in which the energy of the vehicle is recovered by driving only the second motor/generator for regeneration, the second engaging/disengaging unit is applied and the second motor/generator is driven for regeneration, while the fourth engaging/disengaging unit is applied and the first motor/generator is driven for power running.

13. The vehicle driving system of claim 12,
wherein an estimated regeneration amount resulting when the first motor/generator is driven for regeneration by receiving power from the first wheel and another estimated regeneration amount resulting when the second motor/generator is driven for regeneration by receiving power from the second wheel are compared, and
wherein, when the estimated regeneration amount is larger, the first vehicle energy recovery is executed, and when the another estimated regeneration amount is larger, the second vehicle energy recovery control is executed.

14. The vehicle driving system of claim 12,
wherein the electric energy storing device is electrically connected with the first motor/generator and the second motor/generator,
wherein, when the energy stored in the kinetic energy storing device is of a predetermined level or higher, the first engaging/disengaging unit is released and the driving of the second motor/generator for power running is stopped or is suppressed, or the fourth engaging/disengaging unit is released and the driving of the first motor/generator for power running is stopped or is suppressed.

15. The vehicle driving system of claim 12,
wherein, when the first vehicle energy recovery control is executed, the fourth engaging/disengaging unit is released and the second engaging/disengaging unit is released, and
wherein, when the second vehicle energy recovery control is executed, the first engaging/disengaging unit is released and the third engaging/disengaging unit is released.

16. The vehicle driving system of claim 11, further including:
wherein the electric energy storing device is electrically connected with the first motor/generator and the second motor/generator,
wherein, when a third vehicle energy recovery control is executed in which the energy of the vehicle is recovered by driving the first motor/generator and the second motor/generator for regeneration, the third engaging/disengaging unit is applied, the fourth engaging/disengaging unit is released and the first motor/generator is driven for regeneration, while the second engaging/disengaging unit is applied, the first engaging/disengaging unit is released and the second motor/generator is driven for regeneration.

17. The vehicle driving system of claim 11,
wherein, when a first vehicle drive control is executed in which the vehicle is driven by the first wheel which rotates by receiving power from the first motor/generator, the first engaging/disengaging unit is applied and the second motor/generator is driven for regeneration, while the third engaging/disengaging unit is applied and the first motor/generator is driven for power running,
wherein, when a second vehicle drive control is executed in which the vehicle is driven by the second wheel which rotates by receiving power from the second motor/generator, the fourth engaging/disengaging unit is applied and the first motor/generator is driven for regeneration, while the second engaging/disengaging unit is applied and the second motor/generator is driven for power running.

18. The vehicle driving system of claim 17,
wherein, of the first wheel which rotates by receiving power from the first motor/generator and the second wheel which rotates by receiving power from the second motor/generator,
when the first wheel is easier to slip, the second vehicle drive control is executed, and
when the second wheel is easier to slip, the first vehicle drive control is executed.

19. The vehicle driving system of claim 17,
wherein, when the first vehicle drive control is executed, the second engaging/disengaging unit is released and the fourth engaging/disengaging unit is released, and wherein, when the second vehicle drive control is executed, the third engaging/disengaging unit is released, and the first engaging/disengaging unit is released.

20. The vehicle driving system of claim 11,
wherein the electric energy storing device is electrically connected with the first motor/generator and the second motor/generator,
wherein, when a third vehicle drive control is executed in which the vehicle is driven by driving the first motor/generator and the second motor/generator for power running, the third engaging/disengaging unit is applied, the fourth engaging/disengaging unit is released and the first motor/generator is driven for power running, while the second engaging/disengaging unit is applied, the first engaging/disengaging unit is released and the second motor/generator is driven for power running.

21. The vehicle driving system of claim 10,
wherein rotational shafts of the first motor/generator, the second motor/generator and the kinetic energy storing devices are disposed coaxially with one another.

22. The vehicle driving system of claim 1, further including:
another kinetic energy storing device which is different from the kinetic energy storing device,
wherein the first motor/generator is further mechanically connected with the another kinetic energy storing device.

23. The vehicle driving system of claim 22, further including:
a third engaging/disengaging unit which is provided on a power transmission path between the first motor/generator and the first wheel and which engages or disengages a side of the first motor/generator and a side of the first wheel by being applied or released; and
a fourth engaging/disengaging unit which is provided on a power transmission path between the first motor/generator and the another kinetic energy storing device and which engages or disengages a side of the first motor/generator and a side of the another kinetic energy storing device by being applied or released.

24. The vehicle driving system of claim 23,
wherein, when a first vehicle energy recovery control is executed in which the energy of the vehicle is recovered by driving only the first motor/generator for regeneration, the third engaging/disengaging unit is applied and the first motor/generator is driven for regeneration, while the first engaging/disengaging unit is applied and the second motor/generator is driven for power running, and
wherein, when a second vehicle energy recovery control is executed in which the energy of the vehicle is recovered by driving only the second motor/generator for regeneration, the second engaging/disengaging unit is applied and the second motor/generator is driven for regeneration, while the fourth engaging/disengaging unit is applied and the first motor/generator is driven for power running.

25. The vehicle driving system of claim 23,
wherein, when a first vehicle drive control is executed in which the vehicle is driven by the first wheel which rotates by receiving power from the first motor/generator, the first engaging/disengaging unit is applied, the second motor/generator is driven for regeneration, the third engaging/disengaging unit is applied, and the first motor/generator is driven for power running, and
wherein, when a second vehicle drive control is executed in which the vehicle is driven by the second wheel which rotates by receiving power from the second motor/generator, the fourth engaging/disengaging unit is applied, the first motor/generator is driven for regeneration, the second engaging/disengaging unit is applied, and the second motor/generator is driven for power running.

26. The vehicle driving system of claim 23,
wherein the electric energy storing device is electrically connected with the first motor/generator and the second motor/generator,
wherein, when a third vehicle energy recovery control is executed in which the energy of the vehicle is recovered by driving the first motor/generator and the second motor/generator are driven for regeneration, the third engaging/disengaging unit is applied, the fourth engaging/disengaging unit is released and the first motor/generator is driven for regeneration, while the second engaging/disengaging unit is applied, the first engaging/disengaging unit is released and the second motor/generator is driven for regeneration.

27. The vehicle driving system of claim 23,
wherein the electric energy storing device is electrically connected with the first motor/generator and the second motor/generator,
wherein, when a third vehicle drive control is executed in which the vehicle is driven by driving the first motor/generator and the second motor/generator for power driving, the third engaging/disengaging unit is applied, the fourth engaging/disengaging unit is released and the first motor/generator is driven for power running, while the second engaging/disengaging unit is applied, the first engaging/disengaging unit is released and the second motor/generator is driven for power running.

28. The vehicle driving system of claim 22,
wherein a rotational shaft of the kinetic energy storing device and the another kinetic energy storing device are disposed on different straight lines.

29. The vehicle driving system of claim 1,
wherein the first wheel and the second wheel are disposed in a longitudinal direction of the vehicle.

30. The vehicle driving system of claim 1,
wherein the electric energy storing device includes a secondary battery and can be charged by a charger outside the vehicle.

31. The vehicle driving system of claim 30, further including:
an electric energy generating device disposed in parallel to the electric energy storing device.

32. The vehicle driving system of claim 1, further including:
a prime mover which is mechanically connected with either of the first wheel and the second wheel.

\* \* \* \* \*